(12) United States Patent
Zhamu et al.

(10) Patent No.: US 10,158,122 B2
(45) Date of Patent: Dec. 18, 2018

(54) GRAPHENE OXIDE-BONDED METAL FOIL THIN FILM CURRENT COLLECTOR AND BATTERY AND SUPERCAPACITOR CONTAINING SAME

(71) Applicant: Nanotek Instruments, Inc., Dayton, OH (US)

(72) Inventors: Aruna Zhamu, Springboro, OH (US); Yi-Jun Lin, Taoyuan (TW); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 120 days.

(21) Appl. No.: 15/231,498

(22) Filed: Aug. 8, 2016

(65) Prior Publication Data

US 2018/0040900 A1   Feb. 8, 2018

(51) Int. Cl.
*H01M 4/66* (2006.01)
*H01M 10/0525* (2010.01)
(Continued)

(52) U.S. Cl.
CPC .......... *H01M 4/667* (2013.01); *H01G 11/68* (2013.01); *H01G 11/70* (2013.01); *H01M 4/661* (2013.01);
(Continued)

(58) Field of Classification Search
None
See application file for complete search history.

(56) References Cited

U.S. PATENT DOCUMENTS 7,071,258 B1    7/2006  Jang et al.
2005/0271574 A1  12/2005  Jang et al.
(Continued)

FOREIGN PATENT DOCUMENTS

CN   104600320 A   5/2015
WO   2012151880 A1  11/2012

OTHER PUBLICATIONS

Li Wang, Xiangming He, Jianjun Li, Jian Gao, Mou Fang, Guangyu Tian, Jianlong Wang, Shoushan Fan, "Graphene-coated plastic film as current collector for lithium/sulfur batteries," J. Power Source, 239 (2013) 623-627.
(Continued)

*Primary Examiner* — Daniel S Gatewood

(57) ABSTRACT

A graphene oxide-bonded metal foil current collector in a battery or supercapacitor, comprising: (a) a free-standing, non-supported thin metal foil having a thickness from 1 μm to 30 μm and two primary surfaces; and (b) a thin film of graphene oxide chemically bonded to at least one of the two primary surfaces without using a binder or adhesive wherein the primary surface does not contain a metal oxide layer and the thin film of graphene oxide has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to the primary surfaces, exhibiting a thermal conductivity greater than 500 W/mK, and/or electrical conductivity greater than 1,500 S/cm when measured alone without the thin metal foil.

26 Claims, 22 Drawing Sheets

(51) Int. Cl.
  *H01G 11/36* (2013.01)
  *H01G 11/68* (2013.01)
  *H01G 11/70* (2013.01)

(52) U.S. Cl.
  CPC ....... *H01M 4/663* (2013.01); *H01M 10/0525* (2013.01); *H01G 11/36* (2013.01)

(56) References Cited

U.S. PATENT DOCUMENTS

| | | | |
|---|---|---|---|
| 2008/0048152 A1 | 2/2008 | Jang et al. | |
| 2012/0141864 A1* | 6/2012 | Juzkow | H01M 2/26 429/163 |
| 2013/0095389 A1 | 4/2013 | Bhardwaj et al. | |
| 2013/0319870 A1* | 12/2013 | Chen | H01M 4/133 205/86 |
| 2014/0127488 A1 | 5/2014 | Zhamu et al. | |
| 2015/0086881 A1* | 3/2015 | Zhamu | H01G 11/68 429/405 |
| 2015/0111449 A1 | 4/2015 | Cruz-Silva et al. | |
| 2017/0047588 A1 | 2/2017 | Mukherjee et al. | |

OTHER PUBLICATIONS

S.J. Richard Prabakar, Yun-Hwa Hwang, Eun Gyoung Bae, Dong Kyu Lee, Myoungho Pyo, "Graphene oxide as a corrosion inhibitor for the aluminum current collector in lithium ion batteries," Carbon, 52 (2013) 128-136.

Zhaoping Liu, et al (Ningbo Institute of Materials and Energy, China), WO 2012/151880 A1 (Nov. 15, 2012).

Gwon, H.; Kim, H-S; Lee, KE; Seo, D-H; Park, YC; Lee, Y-S; Ahn, BT; Kang, K "Flexible energy storage devices based on graphene paper," Energy and Environmental Science. 4 (2011) 1277-1283.

Ramesh C. Bhardwaj and Richard M. Mank, "Graphene current collectors in batteries for portable electronic devices," US 20130095389 A1, Apr. 18, 2013.

Gwon et al., "Flexible Energy Storage Devices Based on Graphene Paper" Energy and Environmental Science (2011) vol. 4, pp. 1277-1283.

Prabakar et al., "Graphene Oxide as a Corrosion Inhibitor for the Aluminum Current Collector in Lithium Ion Batteries" Carbon (2013) vol. 52, pp. 128-136.

Wang et al., "Graphene-Coated Plastic Film as Current Collector for Lithium/Sulfur Batteries" J. Power Source (2013) vol. 239, pp. 623-627.

English language translation of CN104600320A from Google Patents—https://google.com/patents/CN104600320A?cl=en, 7 pages.

English language translation of WO2012151880 from Google Patents—https://www.google.com/patents/WO2012151880A1?cl=en&dq=WO2012151880, 17 pages.

CN104600320A—English language translation from Google Patent—https://patents.google.com/patent/CN104600320A/en, 6 pages.

PCT/US17/18707 International Search Report and Written Opinion dated May 4, 2017, 14 pages.

U.S. Appl. No. 15/231,486 Final Office Action dated Apr. 19, 2018, 15 pages.

U.S. Appl. No. 15/231,486 Nonfinal Office Action dated Oct. 20, 2017, 14 pages.

U.S. Appl. No. 15/231,486 Resp to Final Office Action dated Jul. 16, 2018, 13 pages.

U.S. Appl. No. 15/231,486 Resp to Nonfinal Office Action dated Feb. 1, 2018, 16 pages.

WO 2012151880A1—English language translation from Google Patent—https://patents.google.com/patent/WO2012151880A1/en, 15 pages.

\* cited by examiner

20 μm (Scale bar = 5 μm per interval)

Z

GRAPHENE OXIDE-BONDED METAL FOIL THIN FILM CURRENT COLLECTOR AND BATTERY AND SUPERCAPACITOR CONTAINING SAME

FIELD OF THE INVENTION

The present invention provides a current collector for a lithium battery or supercapacitor. The current collector is a metal foil bonded with a thin graphene oxide film produced from graphene oxide gel. This graphene oxide-bonded thin metal foil is electrolyte-compatible, non-reactive, corrosion-protective, of low contact resistance, thermally and electrically conductive, ultra-thin, and light-weight, enabling a battery or capacitor to deliver a higher output voltage, higher energy density, high rate-capability, and much longer cycle life.

BACKGROUND

This patent application is directed at a current collector that works with an anode electrode (anode active material layer) or a cathode electrode (cathode active material layer) of a lithium cell (e.g. lithium-ion cell, lithium-metal cell, or lithium-ion capacitor), a supercapacitor, a non-lithium battery (such as the zinc-air cell, nickel metal hydride battery, sodium-ion cell, and magnesium-ion cell), and other electrochemical energy storage cells. This application is not directed at the anode active material layer or the cathode active material layer itself.

The lithium-metal cell includes the conventional lithium-metal rechargeable cell (e.g. using a lithium foil as the anode and $MnO_2$ particles as the cathode active material), lithium-air cell (Li-Air), lithium-sulfur cell (Li—S), and the emerging lithium-graphene cell (Li-graphene, using graphene sheets as a cathode active material), lithium-carbon nanotube cell (Li-CNT, using CNTs as a cathode), and lithium-nano carbon cell (Li—C, using nano carbon fibers or other nano carbon materials as a cathode). The anode and/or the cathode active material layer can contain some lithium, or can be prelithiated prior to or immediately after cell assembly.

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than conventional lithium-ion batteries (having a graphite anode).

Historically, rechargeable lithium metal batteries were produced using non-lithiated compounds having relatively high specific capacities, such as $TiS_2$, $MoS_2$, $MnO_2$, $COO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries. Even now, cycling stability and safety concerns remain the primary factors preventing the further commercialization of Li metal batteries (e.g. Lithium-sulfur and Lithium-transition metal oxide cells) for EV, HEV, and microelectronic device applications.

Prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1 (with graphite specific capacity <372 mAh/g).

Although lithium-ion (Li-ion) batteries are promising energy storage devices for electric drive vehicles, state-of-the-art Li-ion batteries have yet to meet the cost, safety, and performance targets (such as high specific energy, high energy density, good cycle stability, and long cycle life). Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy (gravimetric energy density) of commercially available Li-ion cells featuring a graphite anode and a lithium transition-metal oxide or phosphate based cathode is typically in the range of 120-220 Wh/kg, most typically 150-200 Wh/kg. The corresponding typical range of energy density (volumetric energy density) is from 300 to 400 Wh/L. These specific energy values are two to three times lower than what would be required in order for battery-powered electric vehicles to be widely accepted.

A typical battery cell is composed of an anode current collector, an anode electrode (also referred to as the anode active material layer, typically including an anode active material, a conductive filler, and a binder resin component), an electrolyte/separator, a cathode electrode (also referred to as the cathode active material layer, typically including a cathode active material, a conductive filler, and a binder resin), a cathode current collector, metal tabs that are connected to external wiring, and casing that wraps around all other components except for the tabs. The sum of the weights and the sum of the volumes of these components are the total cell weight and total cell volume, respectively. The total amount of energy stored by a cell is governed by the amount of cathode active material and the corresponding amount of anode active material. The specific energy and energy density of a cell is then defined as the total amount of energy stored by the total cell weight and cell volume, respectively. This implies that one way to maximize the specific energy and energy density of a cell is to maximize the amounts of active materials and to minimize the amounts of all other components (non-active materials), under the constraints of other battery design considerations.

In other words, the current collectors at the anode and the cathode in a battery cell are non-active materials, which must be reduced (in weight and volume) in order to increase the gravimetric and volumetric energy densities of the battery. Current collectors, typically aluminum foil (at the cathode) and copper foil (at the anode), account for about 15-20% by weight and 10-15% by cost of a lithium-ion battery. Therefore, thinner, lighter foils would be preferred. However, there are several major issues associated with state-of-the-art current collectors:
  (1) Due to easy creasing and tearing, thinner foils tend to be more expensive and harder to work with.
  (2) Due to technical constraints, it is difficult, if not impossible, to fabricate metal foils thinner than 6 μm (e.g. Cu) or thinner than 12 μm (e.g. Al, Ni, stainless steel foil) in mass quantities.
  (3) Current collectors must be electrochemically stable with respect to the cell components over the operating potential window of the electrode. In practice, continued corrosion of the current collectors mainly by the electrolyte can lead to a gradual increase in the internal resistance of the battery, resulting in persistent loss of the apparent capacity.
  (4) Oxidation of metal current collectors is a strong exothermic reaction that can significantly contribute to thermal runaway of a lithium battery.

Accordingly, the current collectors are crucially important for cost, weight, safety, and performance of a battery. Instead of metals, graphene or graphene-coated solid metal or plastic has been considered as a potential current collector material, as summarized in the references listed below:
1. Li Wang, Xiangming He, Jianjun Li, Jian Gao, Mou Fang, Guangyu Tian, Jianlong Wang, Shoushan Fan, "Graphene-coated plastic film as current collector for lithium/sulfur batteries," J. Power Source, 239 (2013) 623-627.
2. S. J. Richard Prabakar, Yun-Hwa Hwang, Eun Gyoung Bae, Dong Kyu Lee, Myoungho Pyo, "Graphene oxide as a corrosion inhibitor for the aluminum current collector in lithium ion batteries," Carbon, 52 (2013) 128-136.
3. Yang Li, et al. Chinese Patent Pub. No. CN 104600320 A (2015, 05, 06).
4. Zhaoping Liu, et al (Ningbo Institute of Materials and Energy, China), WO 2012/151880 A1 (Nov. 15, 2012).
5. Gwon, H.; Kim, H-S; Lee, K E; Seo, D-H; Park, Y C; Lee, Y-S; Ahn, B T; Kang, K "Flexible energy storage devices based on graphene paper," *Energy and Environmental Science*. 4 (2011) 1277-1283.
6. Ramesh C. Bhardwaj and Richard M. Mank, "Graphene current collectors in batteries for portable electronic devices," US 20130095389 A1, Apr. 18, 2013.

Currently, graphene current collectors come in three different forms: graphene-coated substrate [Ref. 1-4], free-standing graphene paper [Ref. 5], and monolayer graphene film produced by transition metal (Ni, Cu)-catalyzed chemical vapor deposition (CVD) followed by metal etching [Ref. 6].

In the preparation of graphene-coated substrate, small isolated sheets or platelets of graphene oxide (GO) or reduced graphene oxide (RGO) are spray-deposited onto a solid substrate (e.g. plastic film or Al foil). In the graphene layer, the building blocks are separated graphene sheets/platelets (typically 0.5-5 μm in length/width and 0.34-30 nm in thickness) that are typically bonded by a binder resin, such as PVDF [Refs. 1, 3, and 4]. Although individual graphene sheets/platelets can have a relatively high electrical conductivity (within the confine of that 0.5-5 μm), the resulting graphene-binder resin composite layer is relatively poor in electrical conductivity (typically <100 S/cm and more typically <10 S/cm). Furthermore, another purpose of using a binder resin is to bond the graphene-binder composite layer to the substrate (e.g. Cu foil); this implies that there is a binder resin (adhesive) layer between Cu foil and the graphene-binder composite layer. Unfortunately, this binder resin layer is electrically insulating and the resulting detrimental effect seems to have been totally overlooked by prior workers.

Although Prabakar, et al. [Ref. 2] does not seem to have used a binder resin in forming an aluminum foil coated with discrete graphene oxide sheets, this graphene oxide-coated Al foil has its own problem. It is well-known in the art that aluminum oxide ($Al_2O_3$) readily forms on surfaces of an aluminum foil and cleaning with acetone or alcohol is not capable of removing this passivating layer of aluminum oxide or alumina. This aluminum oxide layer is not only electrically and thermally insulating, but actually is not resistant to certain types of electrolyte. For instance, the most commonly used lithium-ion battery electrolyte is $LiPF_6$ dissolved in an organic solvent. A trace amount of $H_2O$ in this electrolyte can trigger a series of chemical reactions that involve formation of HF (a highly corrosive acid) that readily breaks up the aluminum oxide layer and continues to corrode the Al foil and consume electrolyte. The capacity decay typically becomes much apparent after 200-300 charge-discharge cycles.

Free-standing graphene paper is typically prepared by vacuum-assisted filtration of GO or RGO sheets/platelets suspended in water. In a free-standing paper, the building blocks are separated graphene sheets/platelets that are loosely overlapped together. Again, although individual graphene sheets/platelets can have a relatively high electrical conductivity (within the confine of that 0.5-5 m), the resulting graphene paper has a very low electrical conductivity; e.g. 8,000 S/m or 80 S/cm [Ref. 5], which is 4 orders of magnitude lower than the conductivity of Cu foil ($8 \times 10^5$ S/cm).

The catalyzed CVD process involves introduction of a hydrocarbon gas into a vacuum chamber at a temperature of 500-800° C. Under these stringent conditions, the hydrocarbon gas gets decomposed with the decomposition reaction being catalyzed by the transition metal substrate (Ni or Cu). The Cu/Ni substrate is then chemically etched away using a strong acid, which is not an environmentally benign procedure. The whole process is slow, tedious, and energy-intensive, and the resulting graphene is typically a single layer graphene or few-layer graphene (up to 5 layers maximum since the underlying Cu/Ni layer loses its effectiveness as a catalyst).

Bhardwaj, et al [Ref. 6] suggested stacking multiple CVD-graphene films to a thickness of 1 μm or a few μm; however, this would require hundreds or thousands of films stacked together (each film being typically 0.34 nm to 2 nm thick). Although Bhardwaj, et al claimed that "The graphene may reduce the manufacturing cost and/or increase the energy density of a battery cell," no experimental data was presented to support their claim. Contrary to this claim, the CVD graphene is a notoriously expensive process and even a single-layer of CVD graphene film would be significantly more expensive than a sheet of Cu or Al foil given the same area (e.g. the same 5 cm×5 cm). A stack of hundreds or thousands of mono-layer or few-layer graphene films as suggested by Bhardwaj, et al would mean hundreds or thousands times more expensive than a Cu foil current collector. This cost would be prohibitively high. Further, the high contact resistance between hundreds of CVD graphene films in a stack and the relatively low conductivity of CVD graphene would lead to an overall high internal resistance, nullifying any potential benefit of using thinner films (1 μm of graphene stack vs. 10 μm of Cu foil) to reduce the overall cell weight and volume. It seems that the patent application of Bhardwaj, et al [Ref. 6], containing no data whatsoever, is nothing but a concept paper.

The above discussions have clearly shown that all three forms of the graphene-enhanced or graphene-based current collector do not meet the performance and cost requirements for use in a battery or supercapacitor. A strong need exists for a different type of material for use as a current collector.

SUMMARY OF THE INVENTION

The present invention provides a graphene oxide-bonded metal foil (thin film) current collector in a battery or supercapacitor. The current collector comprises: (a) a free-standing, non-supported thin metal foil having a thickness from 1 µm to 30 µm and two opposed but substantially parallel primary surfaces; and (b) a thin film of graphene oxide sheets chemically bonded to at least one of the two opposed primary surfaces without using a binder or adhesive wherein the at least one primary surface does not contain a layer of passivating metal oxide (e.g. no alumina layer on this primary surface of Al foil) and wherein the thin film of graphene oxide has a thickness from 10 nm to 10 µm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to the primary surfaces, exhibiting a thermal conductivity greater than 500 W/mK, and/or electrical conductivity greater than 1,500 S/cm when measured alone without the thin metal foil. There is no binder resin or adhesive used in the thin film GO layer itself, and there is no binder resin/adhesive or passivating metal oxide layer between the thin film GO layer and the metal foil layer.

The thin metal foil (e.g. Cu foil, Al foil, stainless steel foil, Ni foil, and Ti foil) must be a free standing film (not supported on another piece of metal plate, for instance) in order to reduce the film thickness and, thus, the length of pathways that electrons collected from or transferred to an electrode active material have to travel. The thin metal foil preferably has a thickness from 4 to 10 µm. Preferably, the thin film of graphene oxide has a thickness from 20 nm to 2 µm (further preferably <1 µm).

Preferably, both primary surfaces are each chemically bonded with a thin film of graphene oxide sheets without using a binder or adhesive; wherein said thin film of graphene oxide has a thickness from 10 nm to 10 µm, an oxygen content from 0.1% to 10% by weight, an inter-graphene plane spacing of 0.335 to 0.50 nm, a physical density from 1.3 to 2.2 g/cm$^3$, all graphene oxide sheets are oriented substantially parallel to each other and parallel to said primary surfaces, exhibiting a thermal conductivity greater than 500 W/mK and electrical conductivity greater than 1,500 S/cm when measured alone without said thin metal foil The thin metal foil is preferably selected from Cu, Ti, Ni, stainless steel, and chemically etched Al foil. Chemical etching is conducted on Al foil in such a manner that the surfaces of the chemically etched Al foil have no passivating $Al_2O_3$ film formed thereon prior to being bonded to the graphene oxide molecules.

We have also surprisingly observed that graphene oxide gel (GO gel containing heavily oxidized graphene molecules in an acidic medium having a pH value of 5.0 or lower, preferably and typically <3.0, and most typically <2.0) is capable of removing the passivating $Al_2O_3$ phase on Al foil surfaces. These GO molecules in a GO gel have an oxygen content typically >20% by wt., more typically >30% by wt., and most typically >40% by wt. In contrast, a simple suspension of discrete graphene or graphene oxide sheets in a liquid medium (e.g. water or an organic solvent), but not in a GO gel state, does not have this etching capability. Even heavily oxidized GO sheets, if recovered and dried from the gel state and then re-dispersed into a liquid medium, can lose this etching ability. The GO sheets, even if just slightly reduced to become reduced graphene oxide (RGO), could lose this etching power as well. These observations are truly unexpected.

In certain embodiments, the thin film of graphene oxide sheets has an oxygen content from 1% to 5% by weight. In certain other embodiments, the thin film of graphene oxide in the invented current collector has an oxygen content less than 1%, an inter-graphene spacing less than 0.345 nm, and an electrical conductivity no less than 3,000 S/cm. Preferably, in the invented current collector, the thin film of graphene oxide has an oxygen content less than 0.1%, an inter-graphene spacing less than 0.337 nm, and an electrical conductivity no less than 5,000 S/cm. Further preferably, the thin film of graphene oxide has an oxygen content no greater than 0.05%, an inter-graphene spacing less than 0.336 nm, a mosaic spread value no greater than 0.7, and an electrical conductivity no less than 8,000 S/cm.

In certain embodiments, the thin film of graphene oxide has an inter-graphene spacing less than 0.336 nm, a mosaic spread value no greater than 0.4, and an electrical conductivity greater than 10,000 S/cm. In some of the invented current collectors, the thin film of graphene oxide exhibits an inter-graphene spacing less than 0.337 nm and a mosaic spread value less than 1.0. Preferably and typically, the thin film of graphene oxide exhibits a degree of graphitization no less than 80% and/or a mosaic spread value no greater than 0.4.

The present invention also provides a process of producing the invented current collector. In this process, the thin film of graphene oxide sheets is obtained by depositing a graphene oxide gel onto the primary surface of the metal foil under the influence of an orientation-controlling stress that aligns the GO molecules or sheets along the primary surface plane directions and then heat-treating the deposited graphene oxide gel at a heat treatment temperature from 80° C. to 1,500° C. Preferably, the heat treatment temperature is from 80° C. to 500° C. Further preferably, the heat treatment temperature is from 80° C. to 200° C.

We have unexpectedly observed that a heat treatment temperature as low as 80° C. to 200° C. is capable of facilitating edge-to-edge merger of highly oriented GO sheets (chemical linking, extending of sheet-like molecules, or "polymerizing or chain-growing" of heavily oxidized GO molecules (from a GO gel) that have been well-aligned. Thus, in certain embodiments, the thin film of graphene oxide contains chemically bonded graphene molecules or chemically merged graphene planes that are parallel to one another.

In some embodiments, the graphene oxide gel is obtained from a graphitic material having a maximum original graphite grain size (resulting in GO sheets having a maximum length) and the thin film of graphene oxide has a grain size larger than this maximum original grain size or maximum GO length. This is a reflection of the notion that highly oriented, heavily oxidized GO sheets or molecules from a gel state are capable of edge-to-edge merging or chemical linking to form longer or wider graphene sheets or molecules.

In certain embodiments, the graphene oxide gel is produced from particles of a natural graphite or artificial graphite composed of graphite crystallites having an initial length $L_a$ in the crystallographic a-axis direction, an initial width $L_b$ in the b-axis direction, and a thickness $L_c$ in the c-axis direction, and the thin film of graphene oxide has a graphene domain or crystal length or width greater than the initial $L_a$ and $L_b$ of the graphite crystallites.

Typically, the thin film of graphene oxide contains graphene planes having a combination of $sp^2$ and $sp^3$ electronic configurations. Preferably, the thin film of graphene oxide is a continuous length film having a length no less than 5 cm (preferably no less than 10 cm and further preferably no less than 20 cm) and a width no less than 1 cm (preferably no less than 10 cm). There are no practical limitations on the length and width of the continuous-length thin film of graphene oxide herein invented.

In certain embodiments, the thin film of graphene oxide, when measured alone, has a physical density greater than 1.8 g/cm3, and/or a tensile strength greater than 40 MPa; preferably having a physical density greater than 1.9 g/cm3, and/or a tensile strength greater than 60 MPa and more preferably having a physical density greater than 2.0 $g/cm^3$, and/or a tensile strength greater than 80 MPa.

The present invention also provides a rechargeable lithium battery or lithium-ion battery containing the presently invented current collector as an anode current collector and/or a cathode current collector. The rechargeable lithium battery may be a lithium-sulfur cell, a lithium-selenium cell, a lithium sulfur/selenium cell, a lithium-air cell, a lithium-graphene cell, or a lithium-carbon cell.

The present invention also provides a capacitor containing the invented current collector as an anode current collector or a cathode current collector, which capacitor is a symmetric ultracapacitor, an asymmetric ultracapacitor cell, a hybrid supercapacitor-battery cell, or a lithium-ion capacitor cell.

DETAILED DESCRIPTION OF PREFERRED EMBODIMENTS

Figure 1A:
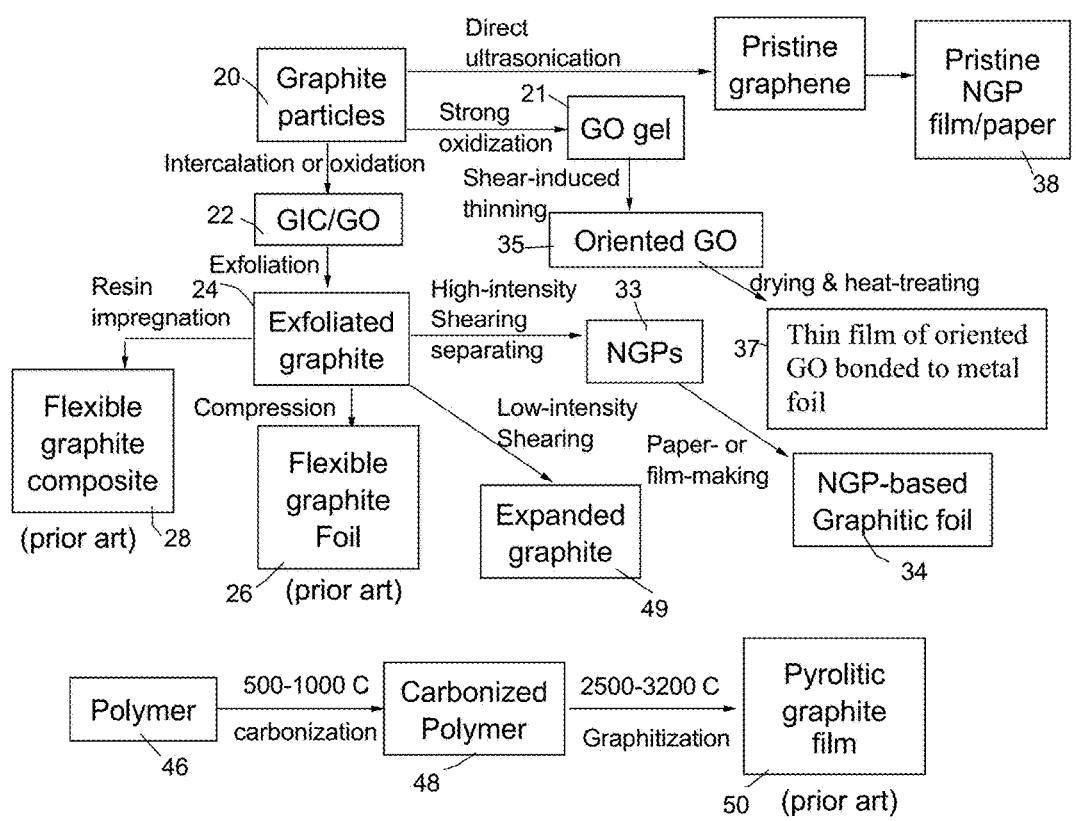
FIG. 1(A) A flow chart illustrating various prior art processes of producing exfoliated graphite products (flexible graphite foils and flexible graphite composites) and pyrolytic graphite (bottom portion), along with a process for producing graphene oxide gel 21, and wet film of oriented GO 35, and thin film 37 of GO bonded to metal foil surface.
Figure 1B:
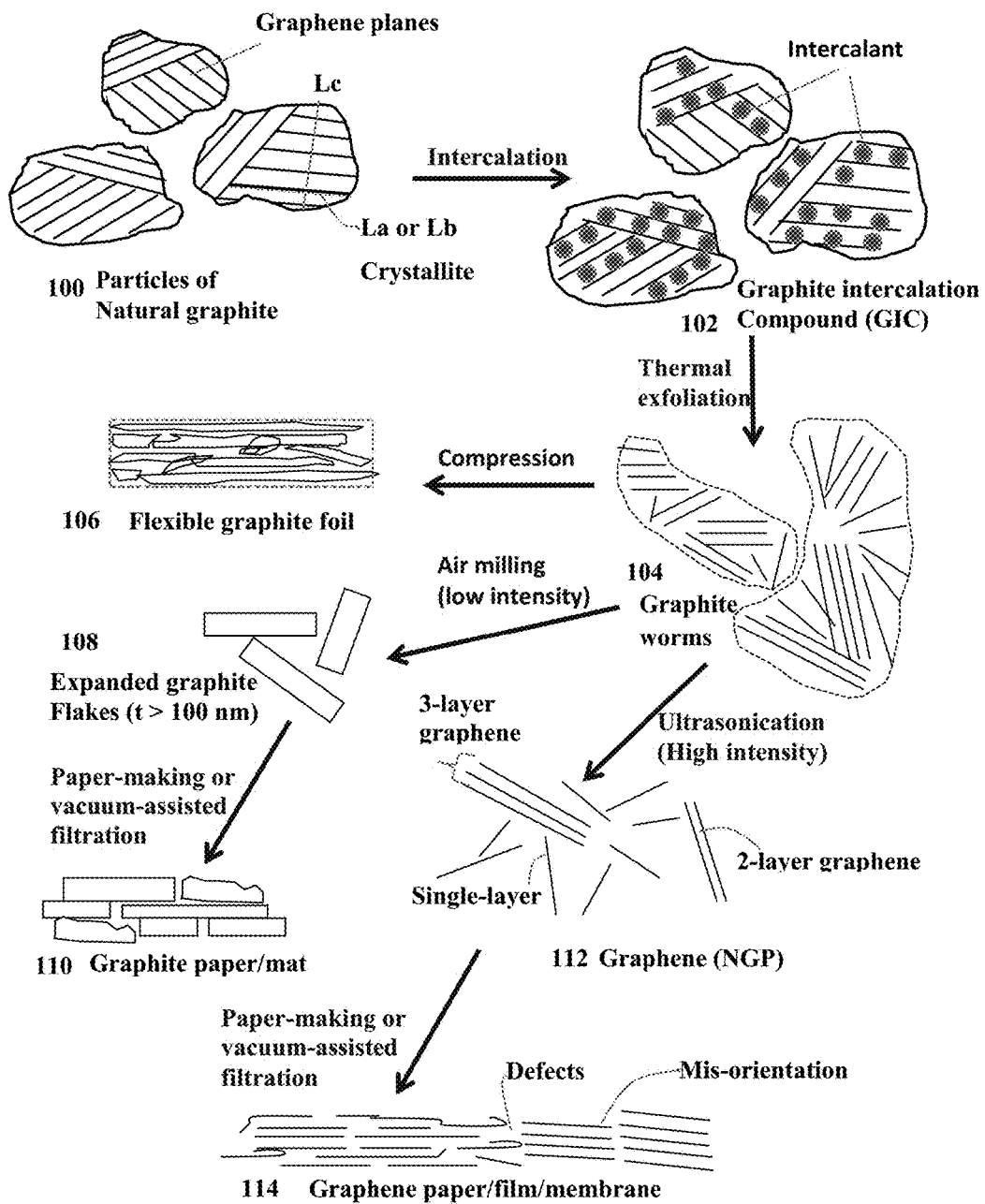
FIG. 1 (B) Schematic drawing illustrating the conventional processes for producing paper, mat, and membrane of simply aggregated graphite or graphene (NGP) flakes/platelets. All processes begin with intercalation and/or oxidation treatment of graphitic materials (e.g. natural graphite particles).
FIG. 1(C) Schematic drawing illustrating the prior art graphene-coated metal foil current collector, wherein a binder resin layer (or passivating aluminum oxide layer) is present between the graphene layer and the metal foil, such as Cu foil (or Al foil).
FIG. 1(D) Schematic drawing illustrating a preferred graphene-bonded metal foil current collector, wherein no binder resin layer or passivating aluminum oxide layer is present between the graphene oxide film and the Cu foil or Al foil.
Figure 1C:
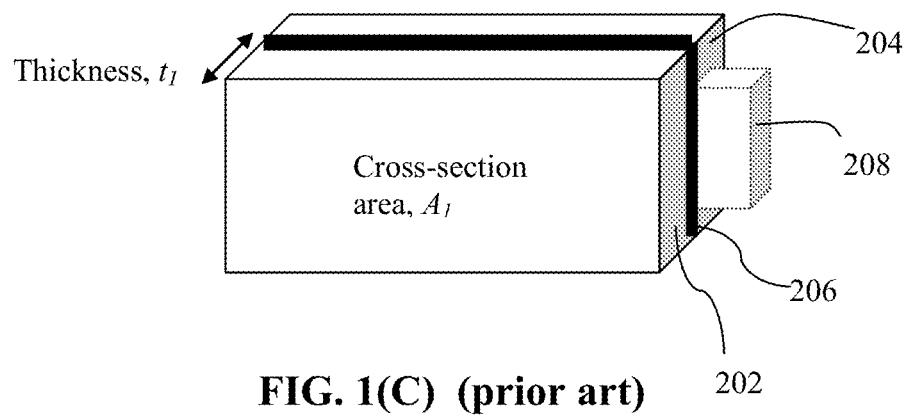
Figure 1D:
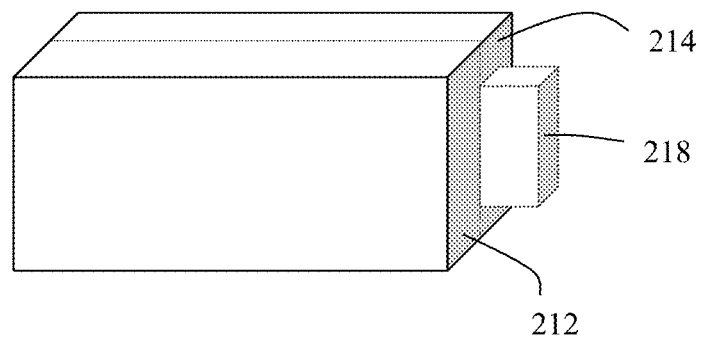

The present invention provides a graphene oxide-bonded metal foil thin-film current collector (e.g. as schematically shown in FIG. 1(D)) in a battery or supercapacitor. The current collector comprises: (a) a free-standing, non-supported thin metal foil (214 in FIG. 1(D)) having a thickness from 1 μm to 30 μm and two opposed but substantially parallel primary surfaces; and (b) a thin film 212 of graphene oxide chemically bonded to at least one of the two opposed primary surfaces without using a binder or adhesive. FIG. 1(D) only shows one primary surface of the metal foil 214 being bonded with a thin film 212 of graphene oxide. However, preferably, the opposite primary surface is also bonded with a thin film of graphene oxide (not shown in FIG. 1(D)). As a terminal pole for electrically connecting to an external circuit, a metal tab 218 is typically welded or soldered to the metal foil 214.

As illustrated in FIG. 1(D), a preferred embodiment of the present invention is a graphene oxide-bonded metal foil current collector, wherein no binder resin layer or passivating aluminum oxide layer is present between the graphene oxide film and the Cu foil or Al foil. In contrast, as schematically illustrated in FIG. 1(C), the prior art graphene-coated metal foil current collector typically and necessarily requires a binder resin layer between the graphene layer (a graphene-resin composite) and the metal foil (e.g. Cu foil). In the case of prior art graphene-coated Al foil [Prabakar et al.; Ref 2], a passivating aluminum oxide (alumina) layer is naturally present between the graphene layer and the Al metal foil. This is due to the well-known fact that aluminum foil, upon fabrication and exposure to room air, always forms a passivating aluminum oxide layer on the surfaces of the Al foil. Simple cleaning by acetone or alcohol is incapable of removing this alumina layer. As will be demonstrated in later paragraphs, the presence of a layer of binder resin or aluminum oxide, even as thin as just 1 nm, has an enormous effect on increasing the contact resistance between the graphene layer and the metal foil. This surprising discovery by us has been totally overlooked by all prior art workers and, hence, prior art graphene-coated metal foils have not met the performance and cost requirements of a lithium battery or supercapacitor current collector.

A very significant and unexpected advantage of bringing graphene oxide sheets in direct contact with the primary surfaces of a Cu, Ni, or Ti foil is the notion that graphene oxide molecules can be well-bonded to these metal foils under the presently invented processing conditions, without using an external resin binder or adhesive (hence, no dramatically increased contact resistance). These processing conditions include well-aligning graphene oxide sheets on the metal foil surface and then heat-treating the two-layer structure at a temperature in the range of 80° C.-1,500° C. (more typically and desirably of 80° C.-500° C., and most typically and desirably of 80° C.-200° C.). Optionally, but not preferably, the heat treatment temperature can be as high as 3,000° C.

These processing conditions, in the cases of aluminum foil-based current collectors, include chemically etching off the passivating aluminum oxide layer prior to being coated with and bonded by graphene oxide, followed by a heat treatment under comparable temperature conditions described above. Alternatively, the graphene oxide may be prepared in a GO gel state, which is characterized by having high oxygen contents, reflecting high amounts of —OH and —COOH groups and having a pH value less than 5.0 (preferably <3.0 and even more preferably <2.0). The Al foil may be allowed to get immersed in a bath of GO gel, wherein the acidic environment naturally removes the passivating $Al_2O_3$ layer. When the Al foil emerges from the bath, GO molecules or sheets naturally adhere to the clean, etched Al foil surfaces, effectively preventing the exposure of Al foil surfaces to open air (hence, no passivating $Al_2O_3$ layer and no added contact resistance between an Al foil surface and the GO layer). This strategy has never been previously disclosed or suggested.

In addition to the chemical bonding power of the presently invented GO layer and the chemical etching power of the GO gel, the resulting thin film of graphene oxide in the presently invented graphene oxide-bonded metal foil has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to the primary surfaces, exhibiting a thermal conductivity greater than 500 W/mK, and/or electrical conductivity greater than 1,500 S/cm when measured alone without the thin metal foil. This thin film of graphene oxide is chemically inert and provides a highly effective protective layer against corrosion of the underlying metal foil.

Now, let us take a closer look at the magnitude of the total resistance (including the contact resistance) in a three-layer structure as illustrated in FIG. 1(C). The electrons in the graphene layer 202 (Layer 1) must move around in this layer, move across through the binder resin or passivating alumina layer 206 (Layer 2), and then move in the metal foil layer 204 (Layer 3) toward the terminal tab 208. For simplicity, we will consider only the total resistance against the electrons moving across the thickness of the graphene layer, the thickness of the binder/passivating layer, and the thickness of the metal foil layer. The electron movement in both the in-plane directions of graphene or metal foil is fast and of low resistance; hence, this resistance is neglected in the instant calculation.

The thickness-direction resistance of a sheet/film of conductor is given by $R=(1/\sigma)(t/A)$, where A=cross-section (length×width) of the conductor, t=thickness of the conductor, σ =conductivity=$1/\varrho$, and $\varrho$ =resistivity, a material constant. A graphene-coated current collector containing a binder or passivating metal oxide layer may be viewed as a three-layer structure (FIG. 1(C)) with the graphene film, interfacial binder resin layer (or passivating alumina layer), and metal foil layer electrically connected in series.

The total resistance is the sum of the resistance values of the three layers: $R=R_1+R_2+R_3=\rho_1(t_1/A_1)+\rho_2(t_2/A_2)+\rho_3(t_3/A_3)=(1/\sigma_1)(t_1/A_1)+(1/\sigma_2)(t_2/A_2)+(1/\sigma_3)(t_3/A_3)$, where ρ=resistivity, σ=conductivity, t=thickness, and A=area of a layer, and, approximately, $A_1=A_2=A_3$. Scanning electron microscopic examinations reveal that the binder resin or passivating alumina layers are typically 5-100 nm thick. The resistivity of most commonly used binder resin (PVDF) and that of alumina ($Al_2O_3$) are typically in the range of $10^{13}$-$10^{15}$ ohm-cm. Assume that $A_1=A_2=A_3=1$ cm$^2$, the thickness-direction resistivity $\rho_1$ of graphene layer=0.1 ohm-cm, the binder or alumina layer resistivity $\rho_2=1\times10^{14}$ ohm-cm and the metal foil layer resistivity is $\rho_3=1.7\times10^{-6}$ ohm-cm (Cu foil), or $\rho_3=2.7\times10^{-6}$ ohm-cm (Al foil). Also assume the optimum conditions where the Cu or Al foil thickness=6 μm, graphene layer thickness=1 μm, and the binder resin layer thickness is only 0.5 nm (actually it is from 5 nm to 100 nm). Then, the total resistance of the three-layer structure would be $5\times10^6$ ohm and the overall conductivity would be as low as $1.4\times10^{-10}$ S/cm (see first data row in Table 1 below). If we assume that the binder resin layer is 10 nm thick, the total resistance of the three-layer structure would be $1\times10^8$ ohm and the overall conductivity would be as low as $7.0\times10^{-12}$ S/cm (see 4th data row in Table 1 below). Such a 3-layer composite structure would not be a good current collector for a battery or supercapacitor since a high internal resistance would mean a low output voltage and high amount of internal heat generated. Similar results are observed for Ni, Ti, and stainless steel foil-based current collectors (data rows 7-10 of Table 1).

TABLE 1

| metal | $\rho_1$ ohm-cm | $t_1$ $10^{-4}$ cm | $A_1$ cm$^2$ | $\rho_2$ ohm-cm | $t_2$ $10^{-4}$ cm | $A_2$ cm$^2$ | $\rho_3$ ohm-cm | $t_3$ $10^{-4}$ cm | $A_3$ cm$^2$ | R ohm | σ = t/(AR) S/cm |
|---|---|---|---|---|---|---|---|---|---|---|---|
| Cu | 0.1 | 1 | 1 | 1.00E+14 | 0.0005 | 1 | 1.70E−06 | 6 | 1 | 5.00E+06 | 1.40E−10 |
| Cu | 0.1 | 1 | 1 | 1.00E+14 | 0.001 | 1 | 1.70E−06 | 6 | 1 | 1.00E+07 | 7.00E−11 |
| Cu | 0.1 | 1 | 1 | 1.00E+14 | 0.005 | 1 | 1.70E−06 | 6 | 1 | 5.00E+07 | 1.40E−11 |
| Cu | 0.1 | 1 | 1 | 1.00E+14 | 0.01 | 1 | 1.70E−06 | 6 | 1 | 1.00E+08 | 7.01E−12 |
| Cu | 0.1 | 1 | 1 | 1.00E+14 | 0.001 | 1 | 1.70E−06 | 6 | 1 | 1.00E+07 | 7.00E−11 |
| Al | 0.1 | 1 | 1 | 1.00E+14 | 0.001 | 1 | 2.70E−06 | 6 | 1 | 1.00E+07 | 7.00E−11 |
| Ni | 0.1 | 1 | 1 | 1.00E+14 | 0.001 | 1 | 7.00E−06 | 6 | 1 | 1.00E+07 | 7.00E−11 |
| Ti | 0.1 | 1 | 1 | 1.00E+14 | 0.001 | 1 | 5.50E−05 | 6 | 1 | 1.00E+07 | 7.00E−11 |
| SS304 | 0.1 | 1 | 1 | 1.00E+14 | 0.001 | 1 | 7.20E−05 | 6 | 1 | 1.00E+07 | 7.00E−11 |

In contrast, if there is no binder resin or alumina layer ($t_2=0$), as is the case of the presently invented current collector, the total resistance of a graphene oxide-bonded Cu foil has a value of $1.0\times10^{0.5}$ ohm (vs. $1.0\times10^{+7}$ ohm of a 3-layer structure containing a 1-μm binder resin layer). Please see Table 2 below. This represents a difference by 12 orders of magnitude (not 12-fold)! The conductivity would be $7.0\times10^{+1}$ S/cm for the instant 2-layer structure, in contrast to $7.0\times10^{11}$ S/cm of the corresponding 3-layer structure. Again, the difference is by 12 orders of magnitude. Furthermore, we have discovered that the lithium batteries and supercapacitors featuring the presently invented graphene oxide-bonded metal foil current collectors always exhibit a higher voltage output, higher energy density, higher power density, more stable chare-discharge cycling response, and last longer without capacity decay or corrosion issues as compared to prior art graphene-based current collectors

TABLE 2

| metal | $\rho_1$ ohm-cm | $t_1$ $10^{-4}$ cm | $A_1$ cm$^2$ | $\rho_2$ ohm-cm | $t_2$ $10^{-4}$ cm | $A_2$ cm$^2$ | $\rho_3$ ohm-cm | $t_3$ $10^{-4}$ cm | $A_3$ cm$^2$ | R ohm | σ = t/(AR) S/cm |
|---|---|---|---|---|---|---|---|---|---|---|---|
| Cu | 0.1 | 1 | 1 | 1.00E+14 | 0 | 1 | 1.70E−06 | 6 | 1 | 1.00E−05 | 7.00E+01 |
| Al | 0.1 | 1 | 1 | 1.00E+14 | 0 | 1 | 2.70E−06 | 6 | 1 | 1.00E−05 | 7.00E+01 |
| Ni | 0.1 | 1 | 1 | 1.00E+14 | 0 | 1 | 7.00E−06 | 6 | 1 | 1.00E−05 | 7.00E+01 |
| Ti | 0.1 | 1 | 1 | 1.00E+14 | 0 | 1 | 5.50E−05 | 6 | 1 | 1.00E−05 | 6.98E+01 |
| SS304 | 0.1 | 1 | 1 | 1.00E+14 | 0 | 1 | 7.20E−05 | 6 | 1 | 1.00E−05 | 6.97E+01 |
| Cu | 0.1 | 1 | 1 | 1.00E+14 | 0 | 1 | 1.70E−06 | 12 | 1 | 1.00E−05 | 1.30E+02 |
| Al | 0.1 | 1 | 1 | 1.00E+14 | 0 | 1 | 2.70E−06 | 12 | 1 | 1.00E−05 | 1.30E+02 |
| Ni | 0.1 | 1 | 1 | 1.00E+14 | 0 | 1 | 7.00E−06 | 12 | 1 | 1.00E−05 | 1.30E+02 |
| Ti | 0.1 | 1 | 1 | 1.00E+14 | 0 | 1 | 5.50E−05 | 12 | 1 | 1.01E−05 | 1.29E+02 |
| SS304 | 0.1 | 1 | 1 | 1.00E+14 | 0 | 1 | 7.20E−05 | 12 | 1 | 1.01E−05 | 1.29E+02 |
| Cu | 0.1 | 5 | 1 | 1.00E+14 | 0 | 1 | 1.70E−06 | 100 | 1 | 5.00E−05 | 2.10E+02 |
| Al | 0.1 | 5 | 1 | 1.00E+14 | 0 | 1 | 2.70E−06 | 100 | 1 | 5.00E−05 | 2.10E+02 |

TABLE 2-continued

| metal | $\rho_1$ ohm-cm | $t_1$ $10^{-4}$ cm | $A_1$ $cm^2$ | $\rho_2$ ohm-cm | $t_2$ $10^{-4}$ cm | $A_2$ $cm^2$ | $\rho_3$ ohm-cm | $t_3$ $10^{-4}$ cm | $A_3$ $cm^2$ | R ohm | $\sigma = t/(AR)$ S/cm |
|---|---|---|---|---|---|---|---|---|---|---|---|
| Ni | 0.1 | 5 | 1 | 1.00E+14 | 0 | 1 | 7.00E−06 | 100 | 1 | 5.01E−05 | 2.10E+02 |
| Ti | 0.1 | 5 | 1 | 1.00E+14 | 0 | 1 | 5.50E−05 | 100 | 1 | 5.06E−05 | 2.08E+02 |
| SS304 | 0.1 | 5 | 1 | 1.00E+14 | 0 | 1 | 7.20E−05 | 100 | 1 | 5.07E−05 | 2.07E+02 |

Since the invented graphene-enabled current collector is produced from graphene oxide gel, the terms graphene, graphene oxide (GO), prior art GO suspension, and instant GO gel are now introduced and discussed.

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than the property measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property between these two extremes (i.e. between 5 W/mK and 1,800 W/mK, but typically <100 W/mK).

It would be highly desirable in many applications to produce a bulk graphitic object having sufficiently large dimensions and having all graphene planes being essentially parallel to one another along one desired direction. For instance, it is highly desirable to have one large-size graphite entity (e.g. a fully integrated layer of multiple graphene planes) having the c-axis directions of all the graphene planes being substantially parallel to one another and having a sufficiently large length and/or width for a particular application (e.g. >10 cm² for use as a current collector in a small cell and >200 cm² for use as a current collector in a large cell) and a desired thickness (e.g. 10 nm to 10 μm) for an intended application (e.g. as a thin layer bonded onto a metal foil surface). Thus far, it has not been possible to produce this type of large-size integrated graphene-metal foil entity from existing natural or synthetic graphite particles.

The constituent graphene planes (typically 30 nm-2 μm wide/long) of a graphite crystallite can be exfoliated and extracted or isolated from the graphite crystallite to obtain individual graphene sheets of carbon atoms provided the inter-planar van der Waals forces can be overcome. An isolated, individual graphene sheet of hexagonal carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 6, 2004); and (3) B. Z. Jang, A. Zhamu, and J. Guo, "Process for Producing Nano-scaled Platelets and Nanocomposites," U.S. patent application Ser. No. 11/509,424 (Aug. 8, 2006).

NGPs are typically obtained by intercalating natural graphite particles with a strong acid and/or oxidizing agent to obtain a graphite intercalation compound (GIC) or graphite oxide (GO), as illustrated in FIG. 1(A) (process flow chart) and FIG. 1(B) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 1(A) and 100 in FIG. 1(B)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. This GIC is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid expansion by a factor of 30-300 to form "graphite worms" (24 or 104), which are each a collection of exfoliated, but largely un-separated graphite flakes that remain interconnected. A SEM image of graphite worms is presented in FIG. 2(A).

In one possible subsequent step, these graphite worms (exfoliated graphite or "networks of interconnected/non-separated graphite flakes") can be re-compressed to obtain flexible graphite sheets or foils (26 or 106) that typically have a thickness in the range of 0.1 mm (100 m)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs). Flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 2(B)). Many flakes are inclined with respect to one another at a very large angle (e.g. mis-orientation of 20-40 degrees).

In another possible subsequent step, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 20 nm.

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, and most typically less than 2% by weight.

For the purpose of defining the claims of the instant application, NGPs include discrete sheets/platelets of single-layer and multi-layer pristine graphene, graphene oxide, or reduced graphene oxide. Pristine graphene has essentially 0% oxygen. Graphene oxide (including RGO) can have 0.01%-50% by weight of oxygen. RGO has an oxygen content of 0.01-10% by weight, more typically 0.01-5% by weight, and most typically 0.01-2% by weight.

The GO molecules in graphene oxide gel (GO gel), to be described in detail later, typically contains 20-47% by weight oxygen (more typically 30-47%) immediately after removal of the liquid from the GO gel, but prior to a subsequent heat treatment. The GO gel refers to a homogeneous solution of highly hydrophilic aromatic molecules (graphene oxide molecules bearing oxygen-containing groups, such as —OH, —COOH, and >O, on molecular planes or at the edges) that are dissolved (not just dispersed) in an acidic liquid (e.g. highly acidic water solution having a pH value lower than 5.0, more typically <3.0, and often <2.0). The GO gel per se does not contain visibly discernible or discrete graphene or GO particles in the form of solid sheets or platelets. These GO molecules and the dispersing liquid medium have comparable indices of refraction, making the resulting gel optically transparent or translucent (if the proportion of GO molecules are bot excessively high), or showing lightly brown color.

In contrast, the simple mixture of graphite particles or discrete graphene or graphene oxide sheets/platelets with acids and/or water appears optically dark and totally opaque (even with only <0.1% solid particles suspended in the liquid medium). These particles or graphene or GO sheets/platelets are simply dispersed (not dissolved) in the fluid medium and they do not form a GO gel state.

These GO molecules in a GO gel are highly reactive and may be considered as "living giant molecules". By contrast, the prior art solid sheets/platelets of graphene, GO, and RGO are essentially "dead" species. The GO gel can be formed into a shape with a proper shearing or compression stress (e.g. via casting or molding) on a metal foil surface, dried (with liquid components partially or totally removed), and heat-treated under certain conditions to obtain a film of highly oriented graphene sheets chemically bonded to metal foil surface. The heat treatment serves to chemically link these active or live GO molecules to form a 2-D or 3-D network of chemically bonded graphene molecules of huge molecular weights, and to drastically reduce the oxygen content of GO down to below 10% by weight (heat treatment temperature <200° C.), more typically <5%, further more typically <2% (heat treatment temperature <500° C.), and most typically <<1% (heat treatment temperature up to 1,500° C.).

Although the GO gel per se does not contain visibly discernible/discrete graphene sheets/platelets or NGPs (including "dead" GO sheets/platelets), one can intentionally add discrete graphene sheets/platelets, expanded graphite flakes, and other type of solid filler in the GO gel to form a mixture gel. This mixture gel may be dried and subjected to the same heat treatment to convert the live GO molecules into a film of highly oriented and chemically merged GO sheets. This graphene oxide gel-derived graphene material is now, reinforced with a filler phase (e.g. discrete NGPs, CNTs and carbon fibers).

Solid NGPs (including discrete sheets/platelets of pristine graphene, GO, and GRO), when packed into a film, membrane, or paper sheet (34 or 114), typically do not exhibit a high electrical conductivity. In general, a paper-like structure or mat made from platelets of discrete graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 3(B)), leading to relatively low electric conductivity and low structural strength.

The lower portion of FIG. 1(A) illustrates a typical process for producing pyrolytic graphitic films from a polymer. The process begins with carbonizing a polymer film 46 (e.g. polyimide) at a carbonization temperature of 400-1,000° C. under a typical pressure of 10-15 Kg/cm$^2$ for 2-10 hours to obtain a carbonized material 48, which is followed by a graphitization treatment at 2,500-3,200° C. under an ultrahigh pressure of 100-300 Kg/cm² for 1-24 hours to form a graphitic film 50. It is technically utmost challenging to maintain such an ultrahigh pressure at such an ultrahigh temperature. This is a difficult, slow, tedious, energy-intensive, and extremely expensive process. Furthermore, carbonization of certain polymers (e.g. polyacrylonitrile) involves the emission of toxic species. Additionally, due to the difficulty in making the precursor polyimide films thinner than 30 μm, it has not been possible to produce polyimide-derived pyrolytic film thinner than 15 μm in a mass quantity. This does not meet the requirement of having a current collector 1-10 μm thick.

A special type of graphene thin film (<2 nm) is prepared by catalytic CVD of hydrocarbon gas (e.g. $C_2H_4$) on Ni or Cu surface. With Ni or Cu being the catalyst, carbon atoms obtained via decomposition of hydrocarbon gas molecules at 800-1,000° C. are deposited onto Ni or Cu foil surface to form a sheet of single-layer or few-layer graphene that is poly-crystalline. These graphene thin films, being optically transparent and electrically conducting, are intended for use in applications such as the touch screen (to replace indium-tin oxide or ITO glass) or semiconductor (to replace silicon, Si). However, these ultra-thin polycrystalline graphene films are not sufficiently conducting (too many grains or too much grain boundaries, and all grains being oriented in different directions) and not sufficiently thick for use as a current collector (most preferably from 1 μm to 10 μm). Furthermore, the Ni- or Cu-catalyzed CVD process does not lend itself to the deposition of more than 5-10 graphene planes (typically <2-4 nm, more typically <2 nm) beyond which the underlying Ni or Cu catalyst can no longer provide any catalytic effect. There has been no experimental evidence to indicate that CVD graphene layer thicker than 5 or 10 nm is possible, let alone 1 μm (1,000 nm) to 10 μm (10,000 nm).

The present invention also provides a process for producing a graphene oxide-bonded metal foil current collector, the process comprising: (a) preparing a graphene oxide gel having graphene oxide molecules dispersed and dissolved in a fluid medium wherein the graphene oxide molecules contain an oxygen content higher than 20% by weight (typically higher than 30% and more typically between 30% and 47% by weight); (b) dispensing and depositing a layer of graphene oxide gel onto a primary surface of a supporting metal foil to form a deposited graphene oxide gel thereon, wherein the dispensing and depositing procedure includes shear-induced thinning of the graphene oxide gel (resulting in graphene oxide molecules well-packed and well-aligned in desired direction(s), conducive to merging and integration of GO molecules during a subsequent heat treatment); (c) partially or completely removing the fluid medium from the deposited graphene oxide gel layer to form a dry graphene oxide layer having an inter-plane spacing $d_{002}$ of 0.4 nm to 1.2 nm as determined by X-ray diffraction and an oxygen content no less than 20% by weight; (d) heat treating the graphene oxide layer at a heat treatment temperature from 80 to 1,500° C. to an extent that an inter-plane spacing $d_{002}$ of the graphene oxide film layer is decreased to a value of from 0.3354 nm to 0.5 nm and the oxygen content is decreased to less than 10% by weight.

In a more preferred embodiment, step (c) includes forming a graphene oxide layer having an inter-plane spacing $d_{002}$ of 0.4 nm to 0.7 nm and an oxygen content no less than 20% by weight; and step (d) includes heat-treating the graphene oxide layer to an extent that an inter-plane spacing $d_{002}$ is decreased to a value of from 0.3354 nm to 0.36 nm and the oxygen content is decreased to less than 2% by weight.

The thin film of graphene oxide obtained from heat-treating a graphene oxide gel at a temperature contains chemically bonded graphene molecules. These planar aromatic molecules or graphene planes (hexagonal structured carbon atoms) are parallel to one another. The lateral dimensions (length or width) of these planes are huge, typically several times or even orders of magnitude larger than the maximum crystallite dimension (or maximum constituent graphene plane dimension) of the starting graphite particles. The thin film composed of many "giant graphene oxide domains" having all constituent graphene planes being essentially parallel to one another, having a thin layer of GO molecules chemically bonded to the underlying metal foil. This is a unique and new class of material that has not been previously discovered, developed, or suggested to possibly exist.

The graphene oxide gel is a very unique and novel class of material that surprisingly has great cohesion power (self-bonding, self-polymerizing, and self-crosslinking capability) and adhesive power (capable of chemically bonding to a wide variety of solid surfaces). These characteristics have not been taught or hinted in the prior art. The GO gel is obtained by immersing powders or filaments of a starting graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon microbead, soft carbon, hard carbon, coke, carbon fiber, carbon nano-fiber, carbon nano-tube, or a combination thereof.

When the starting graphite powders or filaments are mixed in the oxidizing liquid medium, the resulting slurry (heterogeneous suspension) initially appears completely dark and opaque. When the oxidation of graphite proceeds at a reaction temperature for a sufficient length of time under a controlled pH condition, the reacting mass can eventually become a homogeneous solution having no discernible or visually identifiable dispersed solid particle (as opposed to the initially heterogeneous suspension that contain identifiable solid particles). The solution can be optically translucent or transparent or brown-colored, which also looks and behaves like a polymer gel. This heavy oxidation-induced graphene oxide gel is composed of graphene oxide molecules dissolved in the liquid medium. The graphene oxide molecules, prior to any subsequent heat treatment, have an oxygen content no less than 20% by weight (typically from 30-50% by weight) and their molecular weights are typically less than 43,000 g/mole (often less than 4,000 g/mole, but typically greater than 200 g/mole) while in a gel state. The graphene oxide gel is composed of graphene oxide molecules dissolved in an acidic medium having a pH value of typically no higher than 5.0 (more typically <3.0 and most typically <2.0).

The graphene oxide gel has a typical viscosity from 500 centipoise (cP) to 500,000 cP when measured at 20° C. prior to shear-induced thinning. The viscosity is more typically greater than 2,000 cP and less than 300,000 cP when measured at 20° C. prior to the shear-induced thinning procedure. Preferably, the viscosity of the GO gel as a precursor to unitary graphene material is in the range of 2,000-50,000 cP. Preferably, the GO gel is subjected to a shear stress field that the viscosity is reduced to below 2,000 cP (or even below 1,000 cP) during or after shear-induced thinning. In an embodiment, the graphene oxide gel has a viscosity greater than 5,000 cP when measured at 20° C. prior to shear-induced thinning, but is reduced to below 5,000 cP (preferably and typically below 2,000 cP or even below 1,000 cP) during or after shear-induced thinning. The viscosity data measured at 20° C., shown in FIGS. 8(A), 8(B), and 8(C) as an example, clearly indicate that even an ultra-high viscosity value (e.g., 300,000 cP) can be reduced down to 1,000-2,000 cP with a sufficiently high shear rate. This is a reduction by more than 2 orders of magnitude, a highly unexpected observation. The straight line of the data when plotted in a log-log scale indicates a shear thinning fluid flow behavior.

In step (b), the GO gel is formed into a shape preferably under the influence of a shear stress. One example of such a shearing procedure is casting or coating a thin film of GO gel (gel-like fluid) using a coating machine. This procedure is similar to a layer of varnish, paint, coating, or ink being coated onto a solid substrate. The roller, "doctor's blade", or wiper creates a shear stress when the film is shaped, or when a relative motion is imposed between the roller/blade/wiper and the supporting substrate. Quite unexpectedly and significantly, such a shearing action reduces the effective viscosity of the GO gel and enables the planar graphene oxide (GO) molecules to well align along, for instance, a shearing direction. Further surprisingly, such a molecular alignment state or preferred orientation is not disrupted when the liquid components in the GO gel are subsequently removed to form a well-packed GO mass that is at least partially dried. The dried GO mass has a high birefringence coefficient between an in-plane direction and the normal-to-plane direction. Another example of such a procedure is injecting or die-casting a GO mass into a mold cavity or shaping die/tooling under the influence of a shearing stress. The liquid component of the sheared GO mass in a mold cavity is then partially or completely removed to obtain a partially or totally dried GO mass containing well-packed and well-aligned "live" GO molecules.

This dried GO mass is then subjected to a properly programmed heat treatment. For a temperature range of 80° C.-500° C., the GO mass primarily undergoes chemical reactions with metal foil surfaces, sustains some chemical merging between GO molecules, and thermally reduces oxygen content from typically 30-50% (as dried) to 5-6%. This treatment results in a reduction of inter-graphene spacing from approximately 0.6-1.0 nm (as dried) to approximately 0.4 nm and an increase in in-plane thermal conductivity from approximately 100 W/mK to 500 W/mK and electrical conductivity from 800 S/cm to >2,000 S/cm. Even with such a low temperature range, some chemical linking occurs. The GO molecules remain well-aligned, but the inter-GO spacing remains relative large (0.4 nm or larger). Many O-containing functional groups survive.

For a heat treatment temperature range of 500° C.-1,500° C., extensive chemical combination, polymerization, and cross-linking between adjacent GO molecules occur. The oxygen content is reduced to typically <2.0% (more typically <1.0%), resulting in a reduction of inter-graphene spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene film-bonded metal foil and its production processes. These chemical linking reactions result in an increase in in-plane thermal conductivity of a graphene thin film to 1,400-1,500 W/mK, and/or in-plane electrical conductivity to >5,000 S/cm.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354$ g+0.344 (1−g), where $d_{002}$ is the interlayer spacing of graphite or graphene crystal in nm. This equation is valid only when $d_{002}$ is equal or less than approximately 0.3440 nm. The graphene oxide film or lightly oxidized graphite crystalline material having a $d_{002}$ higher than 0.3440 nm reflects the presence of oxygen-containing functional groups (such as —OH, >O, and —COOH on graphene molecular plane surfaces) that act as a spacer to increase the inter-graphene spacing.

Another structural index that can be used to characterize the degree of ordering of the presently invented unitary graphene material and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 2,000° C.). However, some values are in the range of 0.4-0.7 if the highest heat treatment temperature (HTT) is between 1,000 and 1,500° C., and in the range of 0.7-1.0 if the HTT is between 500 and 1,000° C.

The heat treatment temperature conditions for GO are such that the thin film of graphene oxide coated on a metal foil is relatively pore-free having a physical density of at least 1.5 g/cm$^3$ or a porosity level lower than 20%. Under more typical processing conditions, the thin film has a physical density of at least 1.7 g/cm$^3$ or a porosity level lower than 10%. In most cases, the film has a physical density greater than 1.8 g/cm$^3$ or a porosity level less than 5%. The chemically bonded graphene planes in the film typically contain a combination of sp$^2$ and sp$^3$ electronic configurations (particularly for those films prepared with the maximum treatment temperature lower than 1,500° C.).

The graphene oxide (GO) gel-derived thin film of graphene oxide-bonded on a metal foil has the following characteristics (separately or in combination):
(1) The thin film of graphene oxide is an integrated graphene phase if formed under a desired shearing stress field condition, followed by a proper heat treatment. The film has wide/long chemically bonded graphene planes that are essentially oriented parallel to one another. In other words, the crystallographic c-axis directions of all grains and all their constituent graphene planes are essentially pointing in the same direction. This conclusion was drawn after an extensive investigation using a combination of SEM, TEM, selected area diffraction (with a TEM), X-ray diffraction, atomic force microscopy (AFM), Raman spectroscopy, and FTIR.
(2) The paper-like sheets of exfoliated graphite worms (i.e., flexible graphite foils), mats of expanded graphite flakes (100 nm in thickness), and paper or membrane of graphene or GO platelets are a simple, un-bonded aggregate/stack of multiple discrete graphite flakes or discrete platelets of graphene, GO, or RGO. In contrast, the presently invented thin film of graphene oxide from GO gel is a fully integrated, single graphene entity or monolith containing no discrete flakes or platelets.

(3) In prior art processes, discrete graphene sheets (<<100 nm in thickness) or expanded graphite flakes (>100 nm) that constitute the original structure of graphite particles could be obtained via expanding, exfoliating, and separating treatments. By simply mixing and re-compressing these discrete sheets/flakes into a thin film, one could attempt to orient these sheets/flakes hopefully along one direction. However, with these conventional processes, the constituent flakes or sheets of the resulting film (aggregate, paper, membrane, or mat) would remain as discrete flakes/sheets/platelets that can be easily discerned or clearly observed even with an un-assisted eye or under a low-magnification optical microscope (×100-×1000).

In contrast, the preparation of the presently invented thin film of GO involves heavily oxidizing the original graphite particles, to the extent that practically every one of the original graphene planes has been oxidized and isolated from one another to become individual molecules that possess highly reactive functional groups (e.g. —OH, >O, and —COOH) at the edge and, mostly, on graphene planes as well. These individual hydrocarbon molecules (containing elements such as O and H, in addition to carbon atoms) are dissolved in the reaction medium (e.g. mixture of water and acids) to form a gel-like mass, herein referred to as the GO gel. This gel is then cast onto a smooth substrate surface or injected into a mold cavity, typically under shear stress field conditions, and the liquid components are then removed to form a dried GO layer. When heated, these highly reactive molecules react and chemically join with one another mostly in lateral directions (length or width directions) along graphene planes (in an edge-to-edge manner) and, in some cases, between graphene planes as well.

Figure 3A:
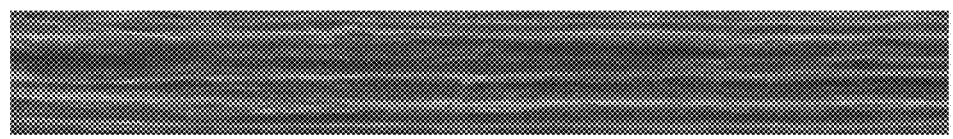
FIG. 3(A) A SEM image of a GO gel-derived graphene monolithic wherein multiple graphene planes (having an original length/width of 30 nm-2 µm) in graphite particles, have been oxidized, exfoliated, re-oriented, and seamlessly merged into continuous-length graphene sheets or layers that can run for hundreds of centimeters wide or long.
Figure 3B:
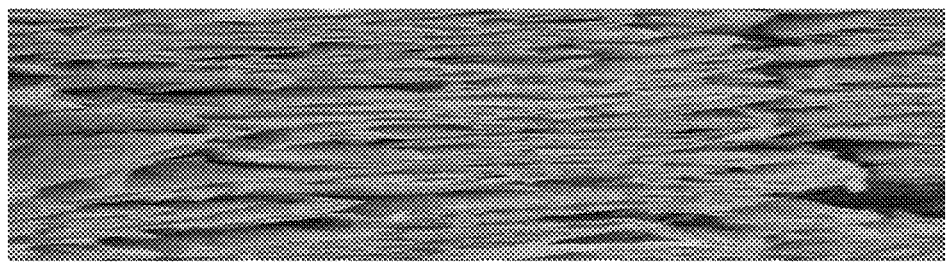
FIG. 3(B) A SEM image of a cross-section of a conventional graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections.
Figure 3C:
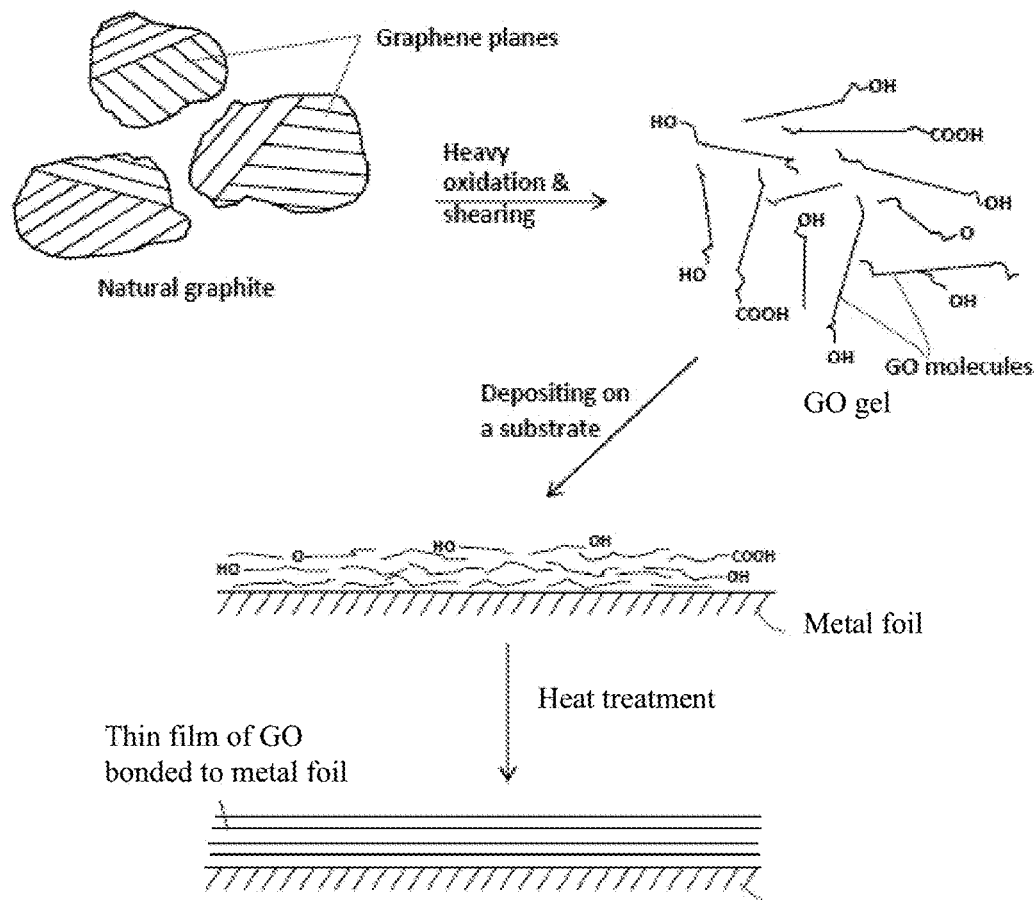
FIG. 3(C) Schematic drawing to illustrate the formation process of an integral GO entity composed of multiple graphene planes that are parallel to one another and are chemically linked in the graphene plane directions and also bonded in the thickness-direction or crystallographic c-axis direction.
Figure 3D:
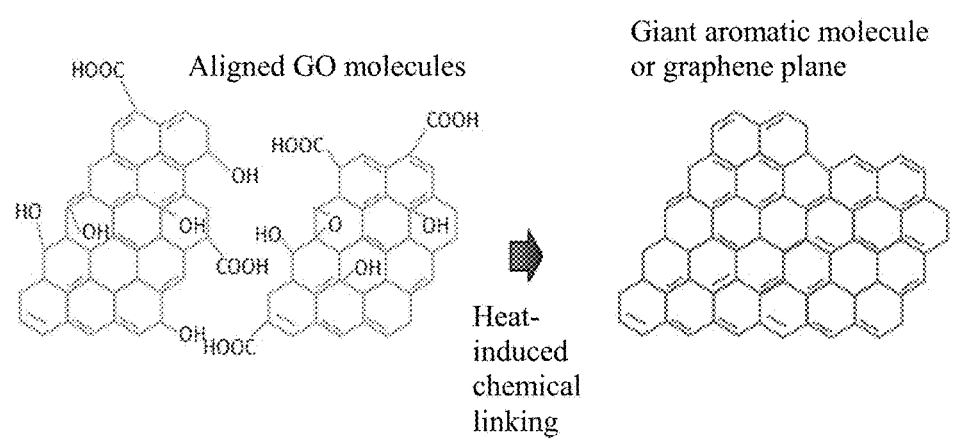
FIG. 3(D) One plausible chemical linking mechanism (only 2 GO molecules are shown as an example; a large number of GO molecules can be chemically linked together to form a large graphene domain).

Illustrated in FIG. 3(D) is a plausible chemical linking mechanism where only 2 aligned GO molecules are shown as an example, although a large number of GO molecules can be chemically linked together to form a unitary graphene layer. Further, chemical linking could also occur face-to-face, not just edge-to-edge. These linking and merging reactions proceed in such a manner that the molecules are chemically merged, linked, and integrated into one single entity or monolith. The molecules completely lose their own original identity and they no longer are discrete sheets/platelets/flakes. There is only one single layer-like structure (unitary graphene entity) that is one huge molecule or just a network of interconnected giant molecules with an essentially infinite molecular weight. All the constituent graphene planes are very large in lateral dimensions (length and width) and, if produced under shear stress conditions (particularly into thin films, <20 μm in thickness) and heat-treated at a higher temperature (e.g. >1,000° C. or much higher), these graphene planes are essentially parallel to one another.

In-depth studies using a combination of SEM, TEM, selected area diffraction, X-ray diffraction, AFM, Raman spectroscopy, and FTIR indicate that the graphene monolith is composed of several huge graphene planes (with length/width typically >>100 μm, more typically >>1 mm, and most typically >>1 cm). These giant graphene planes are stacked and bonded along the thickness direction (crystallographic c-axis direction) often through not just the van der Waals forces (as in conventional graphite crystallites), but also covalent bonds, Not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(4) This integrated graphene entity is not made by gluing or bonding discrete flakes/platelets together with a resin binder or adhesive. Instead, GO molecules in the GO gel are merged through joining or forming of covalent bonds with one another, into an integrated graphene entity, without using any externally added binder molecules or polymers.

(5) This monolithic graphene entity typically has the crystallographic c-axis in all grains being essentially parallel to each other. This entity is derived from a GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon heavy oxidation, these initially discrete graphite particles are chemically transformed into highly aromatic graphene oxide molecules having a significant concentration of edge- or surface-borne functional groups (e.g. —OH, —COOH, etc.). These aromatic GO molecules in the GO gel have lost their original identity of being part of a graphite particle or flake. Upon removal of the liquid component from the GO gel, the resulting GO molecules form an essentially amorphous structure. Upon heat treatment, these GO molecules are chemically merged and linked into a unitary or monolithic graphene entity that is highly ordered.

The resulting thin film of graphene oxide typically has a length or width significantly greater than the $L_a$ and $L_b$ of the original crystallites. The length/width of this thin film is typically greater than the $L_a$ and $L_b$ of the original crystallites. Even the individual grains in this graphene entity have a length or width significantly greater than the $L_a$ and $L_b$ of the original crystallites.

(6) Due to these unique chemical composition (including oxygen content), morphology, crystal structure (including inter-graphene spacing), and structural features (e.g. few defects, good chemical bonding, and no gap between graphene sheets, and no interruptions in graphene planes), the graphene oxide gel-derived monolithic film of graphene oxide has a unique combination of outstanding thermal conductivity, electrical conductivity, mechanical strength, and scratch resistance. This film is also well-bonded to the underlying metal foil without using a binder or adhesive.

The aforementioned features are further described and explained in detail as follows: As illustrated in FIG. 1(B), a graphite particle (e.g. 100) is typically composed of multiple graphite crystallites or grains.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

The upper left portion of FIG. 1(A) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 2(A).

In one prior art process, the exfoliated graphite (or mass of graphite worms) is re-compressed by using a calendering or roll-pressing technique to obtain flexible graphite foils (26 in FIG. 1(A) or 106 in FIG. 1(B)), which are typically much thicker than 100 μm. An SEM image of a cross-section of a flexible graphite foil is presented in FIG. 2(B), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of approximately 1,500 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). These properties are inadequate for many thermal management applications and the present invention is made to address these issues.

In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1(B) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

A mass of multiple NGPs (including discrete sheets/platelets of single-layer and/or few-layer graphene, 33 in FIG. 1(A)) may be made into a graphene paper (34 in FIG. 1(A) or 114 in FIG. 1(B)) using a paper-making process. FIG. 3(B) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections. These NGP aggregates, even when being closely packed, exhibit a relatively low electrical conductivity.

The precursor to the thin film of graphene oxide-bonded on metal foil is graphene oxide gel 21 (FIG. 1(A)). This GO gel is obtained by immersing a graphitic material 20 in a powder or fibrous form in a strong oxidizing liquid in a reaction vessel to form a suspension or slurry, which initially is optically opaque and dark. This optical opacity reflects the fact that, at the outset of the oxidizing reaction, the discrete graphite flakes and, at a later stage, the discrete graphene oxide flakes scatter and/or absorb visible wavelengths, resulting in an opaque and generally dark fluid mass. If the reaction between graphite powder and the oxidizing agent is allowed to proceed at a sufficiently high reaction temperature for a sufficient length of time, this opaque suspension is transformed into a brown-colored and typically translucent or transparent solution, which is now a homogeneous fluid called "graphene oxide gel" (21 in FIG. 1(A)) that contains no discernible discrete graphite flakes or graphite oxide platelets. If dispensed and deposited under a shear stress field, the GO gel undergoes viscosity reduction and molecular orientation to form "oriented GO" 35, which can be heat-treated to become a monolithic thin-film entity 37 bonded to a metal foil.

Again, this graphene oxide gel is typically optically transparent or translucent and visually homogeneous with no discernible discrete flakes/platelets of graphite, graphene, or graphene oxide dispersed therein. In the GO gel, the GO molecules are uniformly dissolved in an acidic liquid medium. In contrast, conventional suspension of discrete graphene sheets, graphene oxide sheets, and expanded graphite flakes in a fluid (e.g. water, organic acid or solvent) look dark, black or heavy brown in color with individual graphene or graphene oxide sheets or expanded graphite flakes discernible or recognizable even with naked eyes or a low-magnification light microscope (100×-1,000×).

Figure 8A:
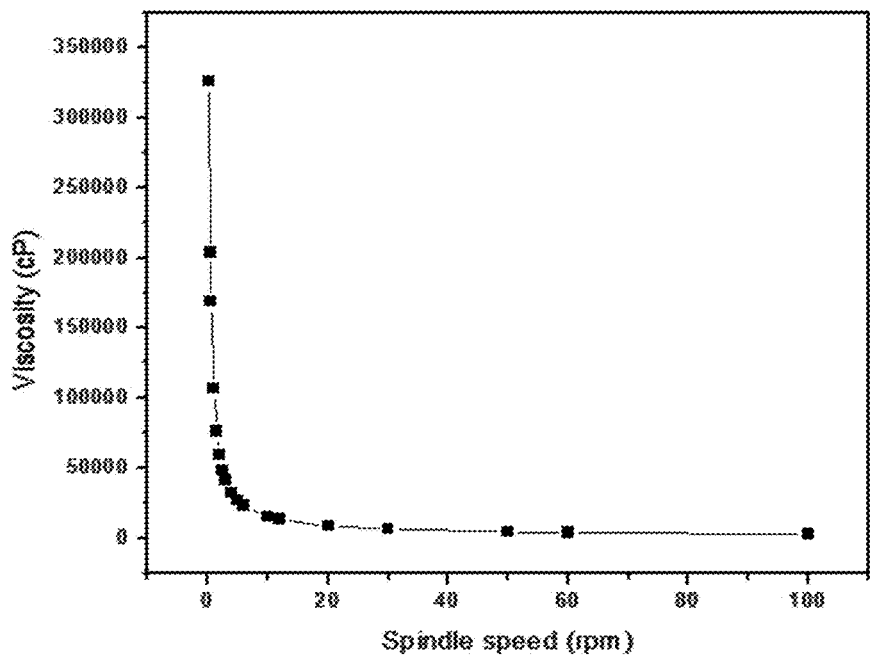
FIG. 8(A) Viscosity values (linear-linear scale) of graphene gel plotted as a function of viscometer spindle speed (proportional to a shear rate)
Figure 8B:
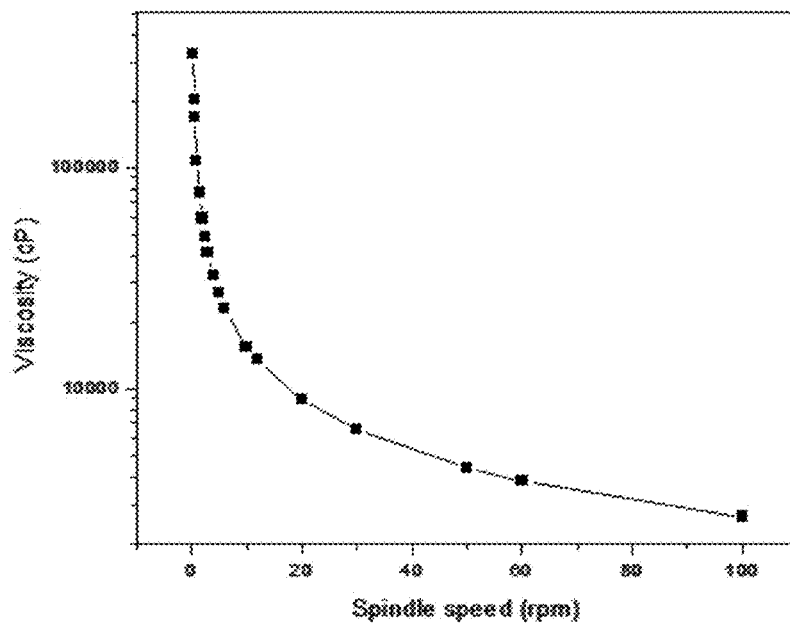
FIG. 8(B) Viscosity values in log-linear scale.
Figure 8C:
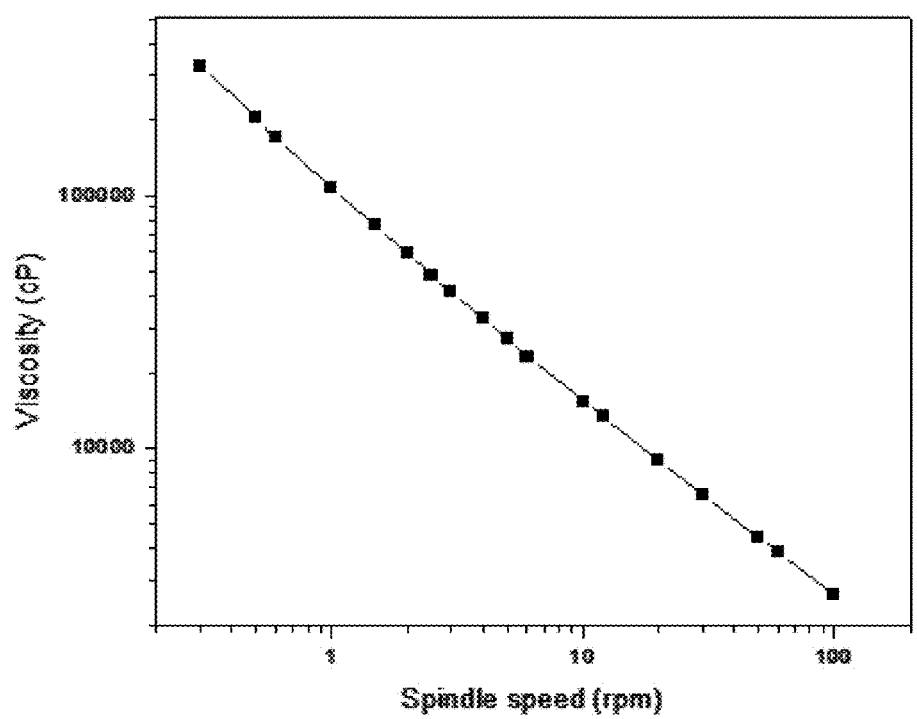
FIG. 8(C) Viscosity values log-log scale.

The graphene oxide molecules dissolved in the liquid medium of a graphene oxide gel are aromatic chains that have an average number of benzene rings in the chain typically less than 1,000, more typically less than 500, and many less than 100. Most of the molecules have more than 5 or 6 benzene rings (mostly >10 benzene rings) from combined atomic force microscopy, high-resolution TEM, and molecular weight measurements. Based on our elemental analysis, these benzene-ring type of aromatic molecules are heavily oxidized, containing a high concentration of functional groups, such as —COOH and —OH and, therefore, are "soluble" (not just dispersible) in polar solvents, such as water. The estimated molecular weight of these graphene oxide polymers in the gel state is typically between 200 g/mole and 43,000 g/mole, more typically between 400 g/mole and 21,500 g/mole, and most typically between 400 g/mole and 4,000 g/mole. The typical viscosity values of GO gels are shown in FIGS. 8(A)-(C).

These soluble molecules behave like polymers and are surprisingly capable of reacting and getting chemically connected with one another (during the subsequent heat treatment or re-graphitization treatment) to form a graphene layer of good structural integrity and high thermal conductivity. Conventional discrete graphene sheets, graphene oxide sheets, or graphite flakes do not have any self-reacting or cohesive bonding capability. Also very surprisingly, during the subsequent heat treatment or re-graphitization treatment, these soluble molecules in the GO gel are capable of chemically bonding metal foil surfaces.

Again, specifically and most significantly, these graphene oxide molecules present in a GO gel state are capable of chemically bonding, linking, or merging with one another and getting integrated into extremely long and wide graphene layers (e.g. FIG. 3(A)) when the gel is dried and heat-treated at a sufficiently high temperature for a sufficiently long period of time. No individual graphene platelets or sheets are discernible; they have been chemically converted to chemically active or live GO molecules that are fully linked and integrated chemically with one another to form a layer-like unitary body in the graphene plane direction and these unitary bodies appear to be chemically bonded with one another along the thickness-direction (or Z-direction). X-ray diffraction studies have confirmed that the d-spacing (inter-graphene plane distance) has been recovered back to approximately 0.3354 nm (with 0.01% by weight of oxygen) to 0.40 nm (with approximately 5.0-10% oxygen). There does not appear to be any gap between these graphene layers and, hence, these layers have been essentially merged into one big unitary body. FIG. 3(A) depicts an example of such a huge unitary body. The formation process for such a graphene entity is further illustrated in FIG. 3(C).

The starting graphitic material to be heavily oxidized for the purpose of forming graphene oxide gel may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. The graphitic material is preferably in a powder or short filament form having a dimension lower than 20 μm, more preferably lower than 10 μm, further preferably smaller than 5 μm, and most preferably smaller than 1 μm.

Using artificial graphite with an average particle size of 9.7 μm as an example, a typical procedure involves dispersing graphite particles in an oxidizer mixture of sulfuric acid, nitric acid, and potassium permanganate (at a weight ratio of 3:1:0.05) at a temperature of typically 0-60° C. for typically at least 3 days, preferably 5 days, and more preferably 7 days or longer. The average molecular weight of the resulting graphene oxide molecules in a gel is approximately 20,000-40,000 g/mole if the treatment time is 3 days, <10,000 g/mole if 5 days, and <4,000 g/mole if longer than 7 days. The required gel formation time is dependent upon the particle size of the original graphitic material, a smaller size requiring a shorter time. It is of fundamental significance to note that if the critical gel formation time is not reached, the suspension of graphite powder and oxidizer (graphite particles dispersed in the oxidizer liquid) appears completely opaque and heterogeneous, meaning that discrete graphite particles or flakes remain suspended (but not dissolved) in the liquid medium. As soon as this critical time is exceeded, the whole suspension becomes optically translucent or transparent (if sufficiently low GO contents) and brown colored, meaning that the heavily oxidized graphite completely loses its original graphite identity and the resulting graphene oxide molecules are completely dissolved in the oxidizer liquid, forming a homogeneous solution (no longer just a suspension or slurry).

It must be further noted that if the suspension or slurry, after a treatment time shorter than the required gel formation time, is rinsed and dried, we would simply recover a graphite oxide powder or graphite intercalation compound (GIC) powder, which can be subsequently exfoliated and separated to produce discrete nano graphene platelets (NGPs). Without an adequate amount of a strong oxidizing agent and an adequate duration of oxidation time, the graphite or graphite oxide particles would not be converted into the GO gel state.

If the graphene oxide gel is obtained from a graphitic material having an original graphite grain size (e.g. an average grain size, $D_g$), the resulting thin film of graphene oxide is a graphene structure having a grain size significantly larger than this original grain size. The film does not have any grain that can be identified to be associated with any particular particle of the starting graphitic material. Original particles have already completely lost their identity when they are converted into graphite oxide molecules that are chemically linked up and merged or integrated into a network of graphene chains essentially infinite in molecular weight.

Further, even if graphene oxide gel is obtained from a graphitic material having multiple graphite crystallites exhibiting no preferred crystalline orientation (e.g. powder of natural graphite) as determined by an X-ray diffraction or electron diffraction method, the resulting thin film bonded on a metal foil typically exhibits a very high degree of preferred crystalline orientation as determined by the same X-ray diffraction or electron diffraction method. This is yet another piece of evidence to indicate that the constituent graphene planes of hexagonal carbon atoms that constitute the particles of the original or starting graphitic material have been chemically modified, converted, re-arranged, re-oriented, linked or cross-linked, merged and integrated, re-graphitized, and even re-crystallized.

The present invention also provides a rechargeable battery that contains a presently invented graphene oxide thin film-bonded metal foil as an anode current collector and/or a cathode current collector. This can be any rechargeable battery, such as a zinc-air cell, a nickel metal hydride cell, a sodium-ion cell, a sodium metal cell, a magnesium-ion cell, or a magnesium metal cell, just to name a few. This invented battery can be a rechargeable lithium battery containing the unitary graphene layer as an anode current collector or a cathode current collector, which lithium battery can be a lithium-sulfur cell, a lithium-selenium cell, a lithium sulfur/selenium cell, a lithium-ion cell, a lithium-air cell, a lithium-graphene cell, or a lithium-carbon cell. Another embodiment of the invention is a capacitor containing the current collector of the present invention as an anode current collector or a cathode current collector, which capacitor is a symmetric ultracapacitor, an asymmetric ultracapacitor cell, a hybrid supercapacitor-battery cell, or a lithium-ion capacitor cell As an example, the present invention provides a rechargeable lithium-metal cell composed of a current collector at the anode, a lithium film or foil as the anode, a porous separator/electrolyte layer, a cathode containing a cathode active material (e.g. lithium-free $V_2O_5$ and $MnO_2$), and a current collector. Either or both the anode current collector and cathode current collector can be a graphene-based current collector of the present invention.

Another example of the present invention is a lithium-ion capacitor (or hybrid supercapacitor) composed of a current collector at the anode, a graphite or lithium titanate anode, a porous separator soaked with liquid or gel electrolyte, a cathode containing a cathode active material (e.g. activated carbon having a high specific surface area), and a current collector. Again, either or both the anode current collector and cathode current collector can be a graphene-based current collector of the present invention.

Yet another example of the present invention is another lithium-ion capacitor or hybrid supercapacitor, which is composed of a current collector at the anode, a graphite anode (and a sheet of lithium foil as part of the anode), a porous separator soaked with liquid electrolyte, a cathode containing a cathode active material (e.g. activated carbon having a high specific surface area), and a current collector. Again, either or both the anode current collector and cathode current collector can be a graphene-based current collector of the present invention.

Still another example of the present invention is a lithium-graphene cell composed of a current collector at the anode, a porous, nano-structured anode (e.g. comprising graphene sheets having high surface areas upon which returning lithium ions can deposit during cell recharge, which are mixed with surface-stabilized lithium powder particles, or having a sheet of lithium foil attached to the nano-structure), a porous separator soaked with liquid electrolyte, a cathode containing a graphene-based cathode active material (e.g. graphene, graphene oxide, or graphene fluoride sheets having high specific surface areas to capture lithium ions during cell discharge), and a cathode current collector. Again, either or both the anode current collector and cathode current collector can be a graphene-based current collector of the present invention.

Example 1: Preparation of Discrete Graphene Sheets (NGPs) and Expanded Graphite Flakes Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin NGPs. The suspension was then filtered and dried at 80° C. to remove residue solvents. The as-prepared NGPs have an average thickness of approximately 9.7 nm.

Another five grams of the resulting exfoliated graphite (EG) were subjected to low-intensity air jet milling to break up graphite worms, forming expanded graphite flakes (having an average thickness of 139 nm). Both samples of expanded graphite flakes and graphene sheets were mixed with a binder resin (PVDF) and then coated onto primary surfaces of Cu foil and Al foil to form expanded graphite-coated current collectors and graphene oxide-coated current collectors. Additionally, a sheet of Al foil was cleaned with acetone and then spray-coated with both GO and RGO sheets. The resulting current collectors were evaluated in both lithium batteries and supercapacitors.

Example 2: Preparation of Graphene from Meso-Carbon Micro-Beads (MCMBs)

Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene. These graphene sheets are made into free-standing graphene paper or deposited (along with a resin binder) onto a thin metal foil. In the case of Al foil, samples of graphene-coated Al foil (no binder) were also prepared.

Example 3: Preparation of Pristine Graphene Sheets/Platelets

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours.

Example 4: Preparation of Graphene Oxide (GO) Gel

Graphene oxide gel was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 m) were immersed and dispersed in the oxidizer mixture liquid, the suspension or slurry appears optically opaque and dark. The suspension remains opaque during the first 52 hours of reaction. However, the suspension gradually turns optically translucent (a little cloudy) when the reaction time exceeds 52 hours, and the color of the suspension changes from black to dark brown. After 96 hours, the suspension suddenly becomes an optically transparent solution with light brown color. The solution appears very uniform in color and transparency, indicating the absence of any dispersed discrete objects. The whole solution behaves like a gel, very similar to a typical polymer gel.

Surprisingly, by casting this gel on a metal foil surface (Cu, Al, Ni, Ti, or stainless steel) and removing the liquid medium from the cast film we obtain a thin film of graphene oxide that is optically transparent. This thin film looks like, feels like, and behaves like a regular polymer film. However, upon heat treatments at a temperature (from 80° C. to 1,500° C.) for typically 1-3 hours, this GO film is transformed into a monolithic thin film entity comprising large-size graphene domains. This GO film is well bonded to the underlying metal foil.

Figure 5A:
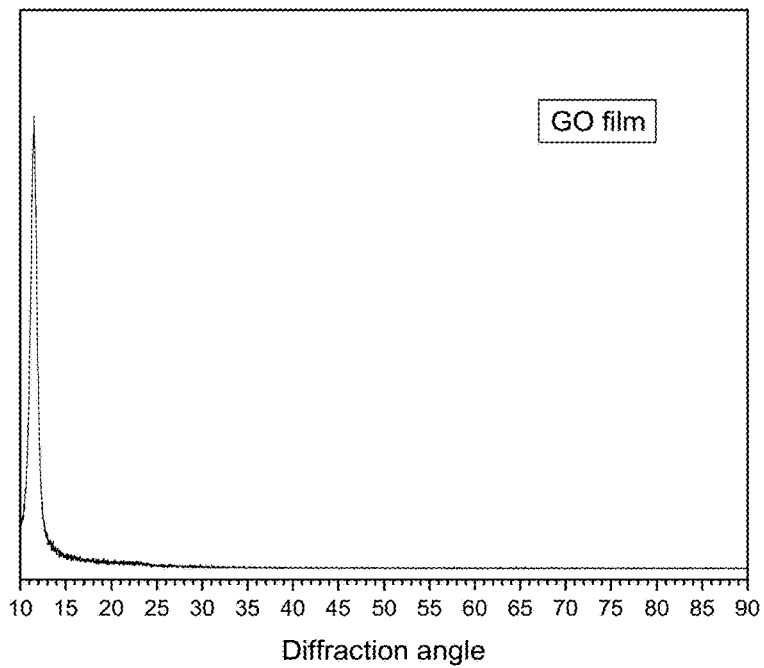
FIG. 5(A) X-ray diffraction curves of a GO film (dried GO gel)
Figure 5B:
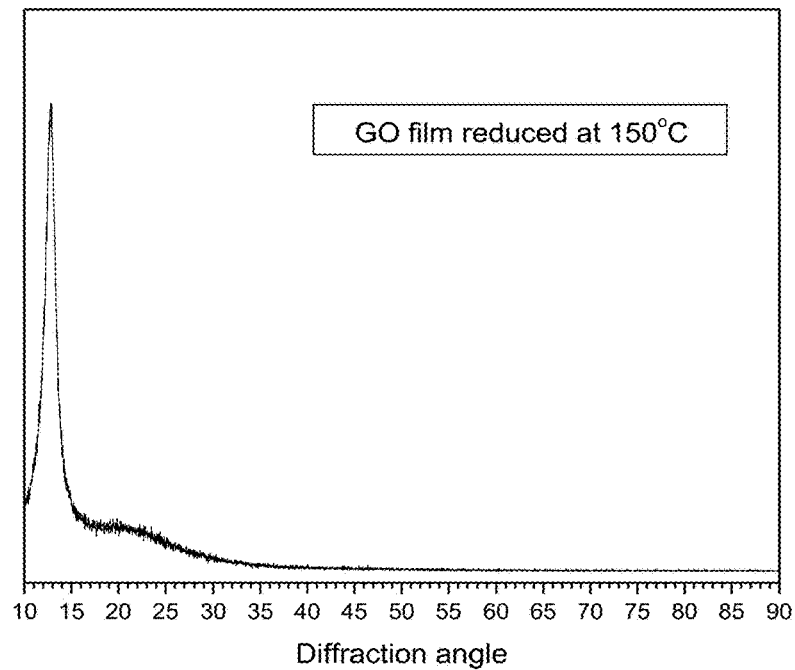
FIG. 5(B) X-ray diffraction curve of GO film thermally reduced at 150° C. (partially reduced), FIG. 5(C) X-ray diffraction curve of highly reduced and re-graphitized GO film, FIG. 5(D) X-ray diffraction curve of highly re-graphitized and re-crystallized GO crystal showing a high-intensity (004) peak, and FIG. 5(E) X-ray diffraction curve of a polyimide-derived HOPG with a HTT as high as 3,000° C.
Figure 5C:
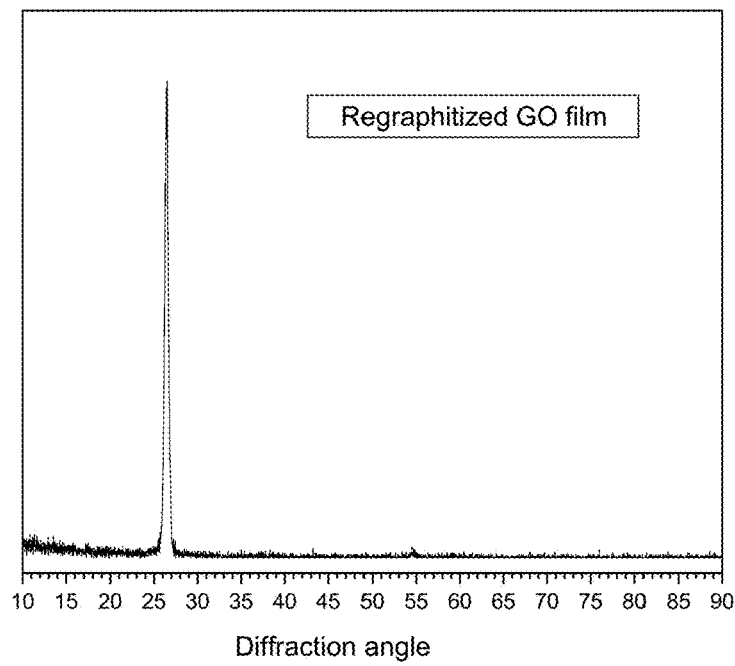

X-ray diffraction curves of a GO film (GO gel coated on a glass surface with liquid medium removed) prior to a heat treatment, a GO film thermally reduced at 150° C. for one hour, and a highly reduced and re-graphitized GO film (a unitary graphene layer) are shown in FIGS. 5(A), 5(B), and 5(C), respectively. The peak at approximately 2θ=12° of the dried GO film (FIG. 5(A)) corresponds to an inter-graphene spacing ($d_{002}$) of approximately 0.7 nm. With some heat treatment at 150° C., the GO film exhibits the formation of a hump centered at 22° (FIG. 5(B)), indicating that it has begun the process of decreasing the inter-graphene spacing, indicating the beginning of chemical linking and ordering processes. With a heat treatment temperature of 1,250° C. for 3 hours, the $d_{002}$ spacing has decreased to approximately 0.34, close to 0.3354 nm of a graphite single crystal.

Figure 5D:
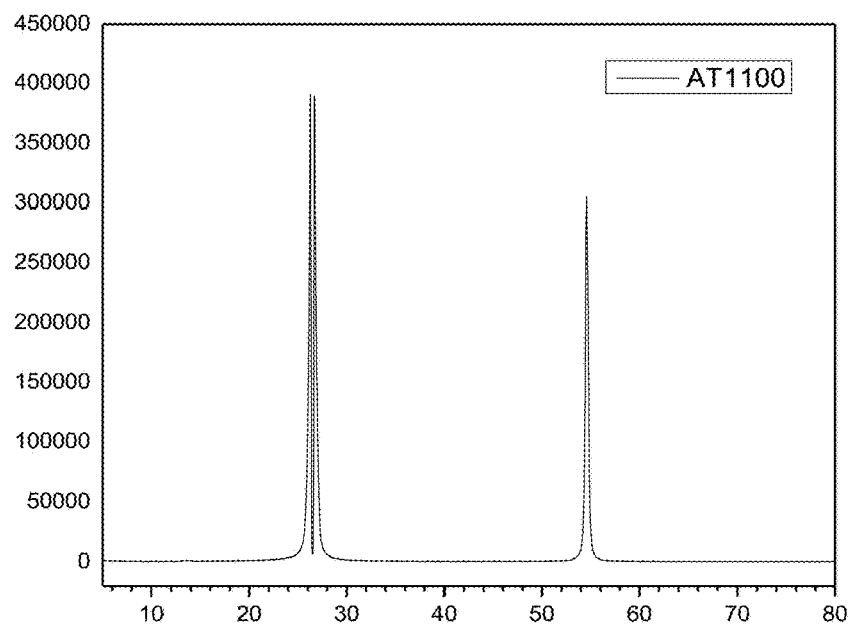
Figure 5E:
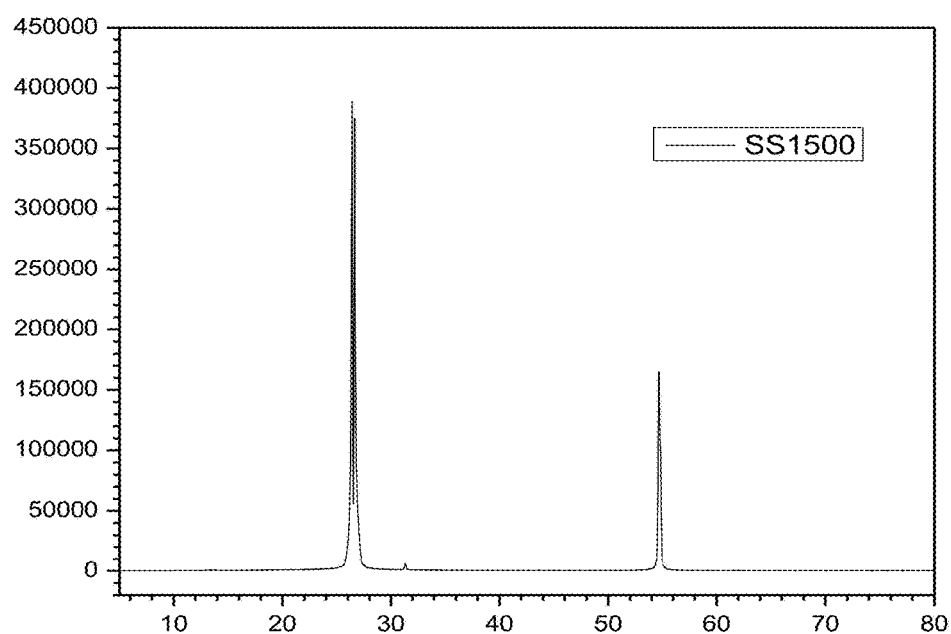

With a heat treatment temperature of 1,500° C. for 3 hours, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane (FIG. 5(D)). The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. One example is presented in FIG. 5(E) for a polyimide-derived PG with a HTT of 3,000° C. for two hours, which exhibits a I(004)/I(002) ratio of about 0.41. In contrast, a thin film of GO bonded on a metal foil prepared with a HTT of 1,500° C. for 4 hours exhibits a I(004)/I(002) ratio of 0.78 and a Mosaic spread value of 0.21, indicating a practically perfect graphene single crystal with an exceptional degree of preferred orientation. There is a synergistic effect between the thin GO layer (<1 μm) prepared from GO gel and the underlying metal foil (Cu, Ni, Ti, and steel).

The "mosaic spread" value obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 1,500° C.).

It may be noted that the I(004)/I(002) ratio for all tens of flexible graphite samples investigated are all <<0.05, practically non-existing in most cases. The I(004)/I(002) ratio for all graphene paper/membrane samples is <0.1 even after a heat treatment at 3,000° C. for 2 hours. Attempts to graphitize the ultra-thin films (<2 nm in thickness) prepared by Cu-catalyzed CVD led to the breaking up of the film and the formation of graphite particles instead. These observations have further confirmed or affirmed the already established notion that the presently invented GO film-bonded metal foil is a new and distinct class of material that is fundamental different from any pyrolytic graphite (PG), flexible graphite (FG), and paper/film/membrane of conventional graphene/GO/RGO sheets/platelets (NGPs) that are free-standing or coated on a metal foil.

Figure 6A:
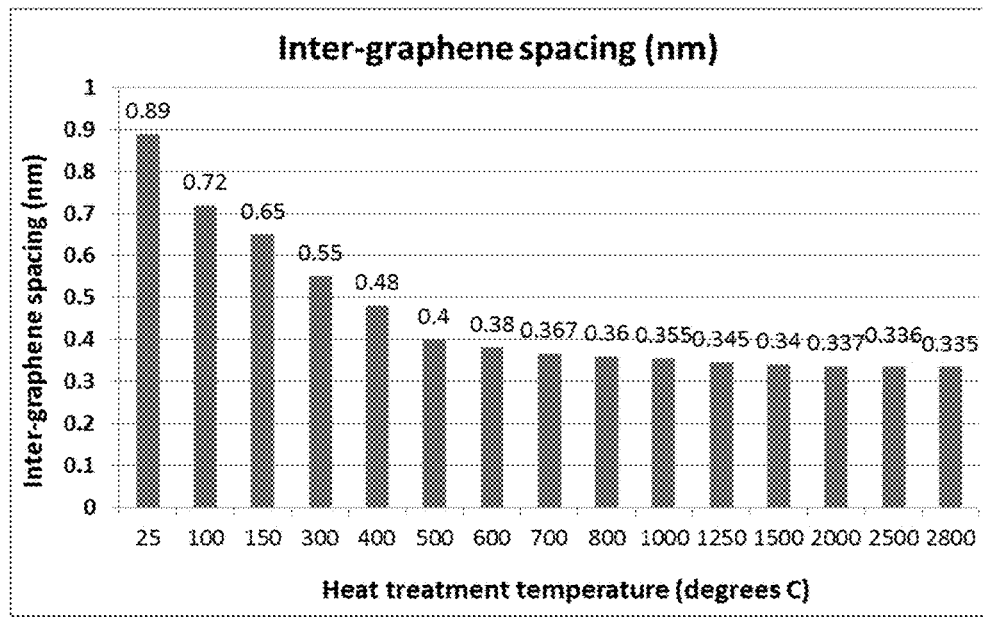
FIG. 6(A) Inter-graphene plane spacing measured by X-ray diffraction.
Figure 6B:
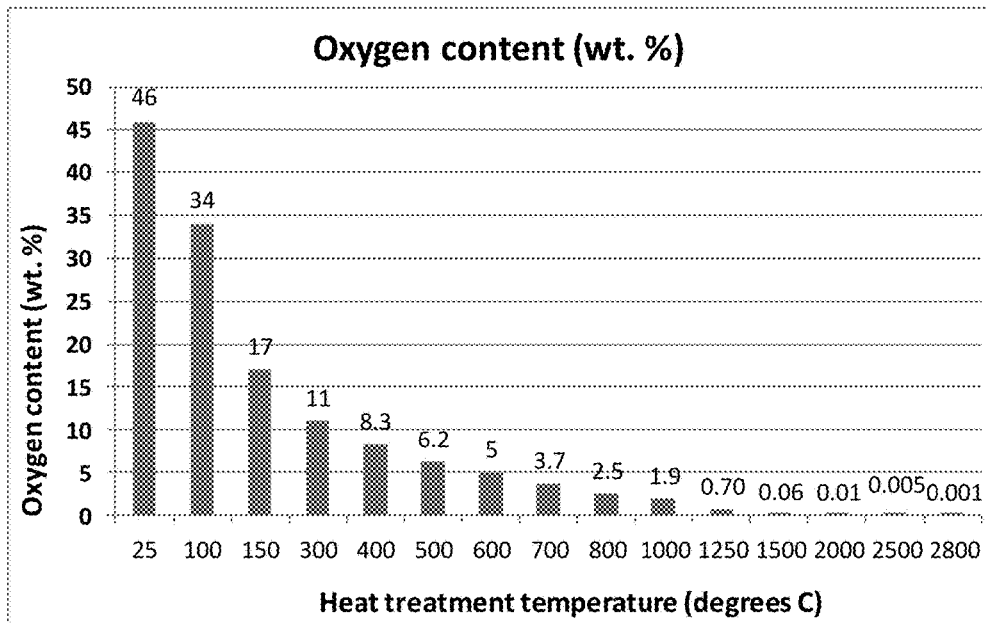
FIG. 6(B) the oxygen content in the GO gel-derived GO thin film.
Figure 6C:
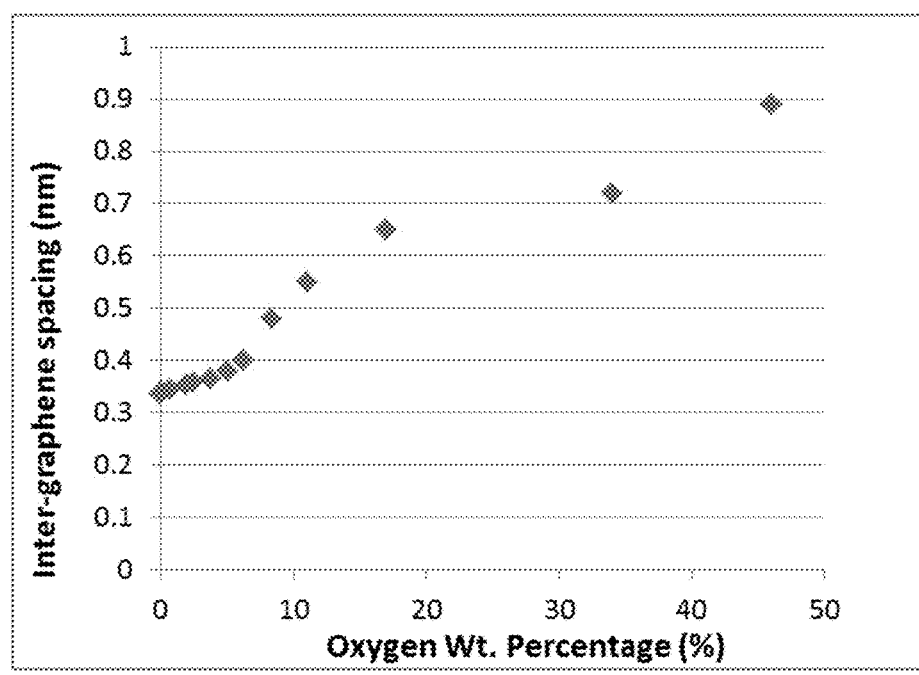
FIG. 6(C) correlation between inter-graphene spacing and the oxygen content.
Figure 6D:
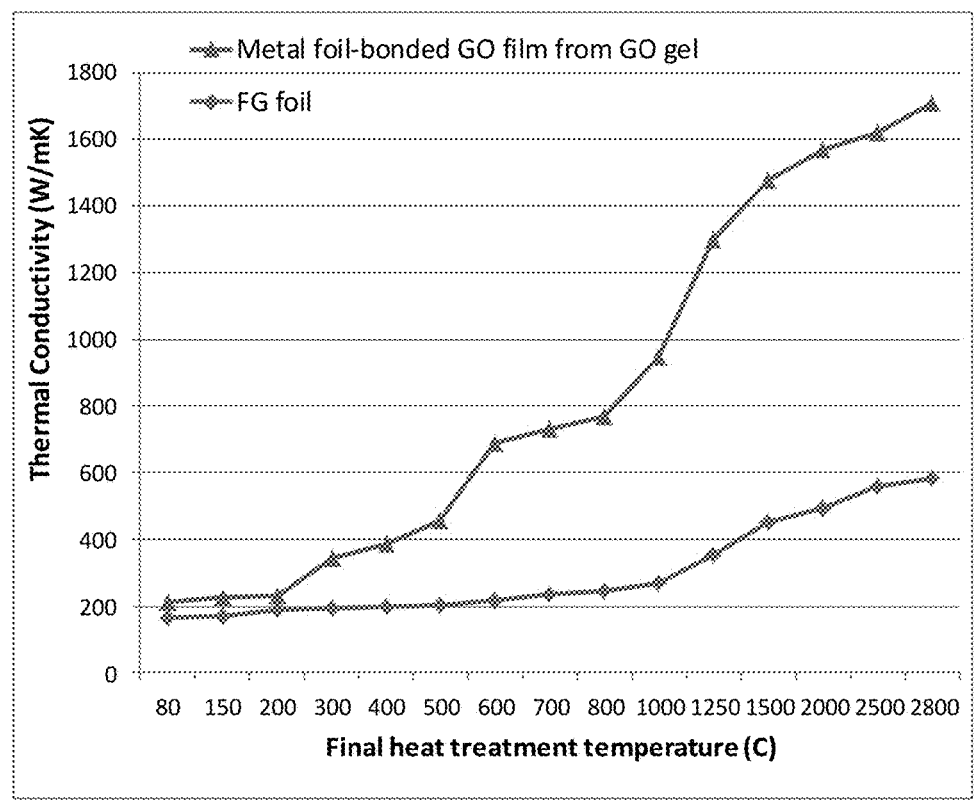
FIG. 6(D) thermal conductivity of GO gel-derived GO thin film and flexible graphite (FG) foil, all plotted as a function of the final heat treatment temperature.

The inter-graphene spacing values of GO gel-derived GO films obtained by heat treating at various temperatures over a wide temperature range are summarized in FIG. 6(A). Corresponding oxygen content values in the GO gel-derived GO films are shown in FIG. 6(B). In order to show the correlation between the inter-graphene spacing and the oxygen content, the data in FIGS. 6(A) and 6(B) are re-plotted in FIG. 6(C). A close scrutiny of FIGS. 6(A)-(C) indicate that there are 4 HTT ranges (80-200° C.; 200-500° C.; 500-1,250° C.; and 1,250-1,500° C.) that lead to 4 respective oxygen content ranges and inter-graphene spacing range. The thermal conductivity of GO gel-derived GO film and corresponding flexible graphite (FG) foil, also plotted as a function of the same final heat treatment temperature range is summarized in FIG. 6(D).

It is of significance to point out that a heat treatment temperature as low as 500° C. is sufficient to bring the average inter-graphene spacing in GO to below 0.4 nm, getting closer and closer to that of natural graphite or that of a graphite single crystal. The beauty of this approach is the notion that this GO gel strategy has enabled us to re-organize, re-orient, and chemically merge the planar graphene oxide molecules from originally different graphite particles or graphene sheets into a graphene monolith with all the graphene planes now being larger in lateral dimensions (significantly larger than the length and width of original graphene planes) and essentially parallel to one another. This has given rise to a thermal conductivity already >420 W/mK (with a HTT of 500° C.) and >950 W/mk with a HTT of 700° C.), which is more than 2- to 4-fold greater than the value (200 W/mK) of the corresponding flexible graphite foil. These planar GO molecules are derived from the graphene planes that constitute the original structure of starting natural graphite particles (used in the procedure of graphite oxidation to form the GO gel). The original natural graphite particles, when randomly packed into an aggregate or "graphite compact", would have their constituent graphene planes randomly oriented, exhibiting relatively low thermal conductivity and having essentially zero strength (no structural integrity). In contrast, the strength of the unitary graphene layer (even without an added reinforcement) is typically already in the range of 40-140 MPa.

With a HTT as low as 800° C., the resulting unitary graphene layer exhibits a thermal conductivity of 1,148 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented unitary graphene layer delivers a thermal conductivity of 1,807 W/mK (FIG. 4(A) and FIG. 6(D)) even though the metal foil has been melted at such a high temperature.

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

Figure 2A:
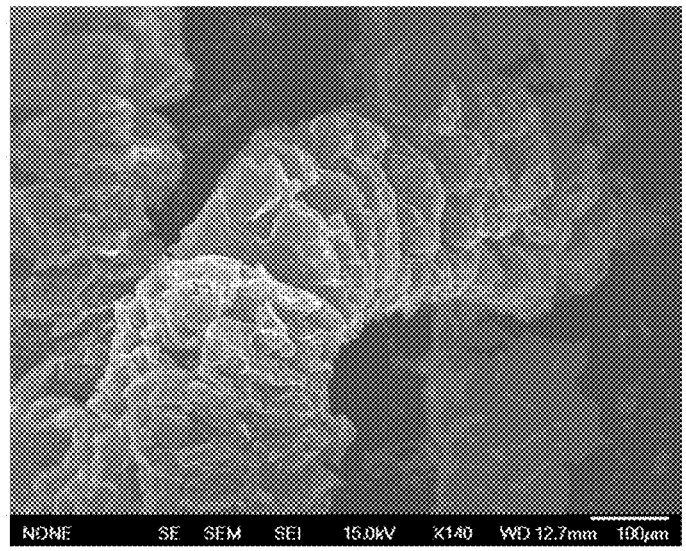
FIG. 2(A) A SEM image of a graphite worm sample after thermal exfoliation of graphite intercalation compounds (GICs) or graphite oxide powders.
Figure 2B:
FIG. 2(B) An SEM image of a cross-section of a flexible graphite foil, showing many graphite flakes with orientations not parallel to the flexible graphite foil surface and also showing many defects, kinked or folded flakes.

A close scrutiny and comparison of FIGS. 2(A), 3(A), and 3(B) indicates that the graphene layers in a monolithic GO thin film are substantially oriented parallel to one another; but this is not the case for flexible graphite foils and graphene oxide paper. The inclination angles between two identifiable layers in the GO thin film entity are mostly less than 5 degrees. In contrast, there are so many folded graphite flakes, kinks, and mis-orientations in flexible graphite that many of the angles between two graphite flakes are greater than 10 degrees, some as high as 45 degrees (FIG. 2(B)). Although not nearly as bad, the mis-orientations between graphene platelets in NGP paper (FIG. 3(B)) are also high and there are many gaps between platelets. The unitary graphene entity is essentially gap-free.

Figure 4A:
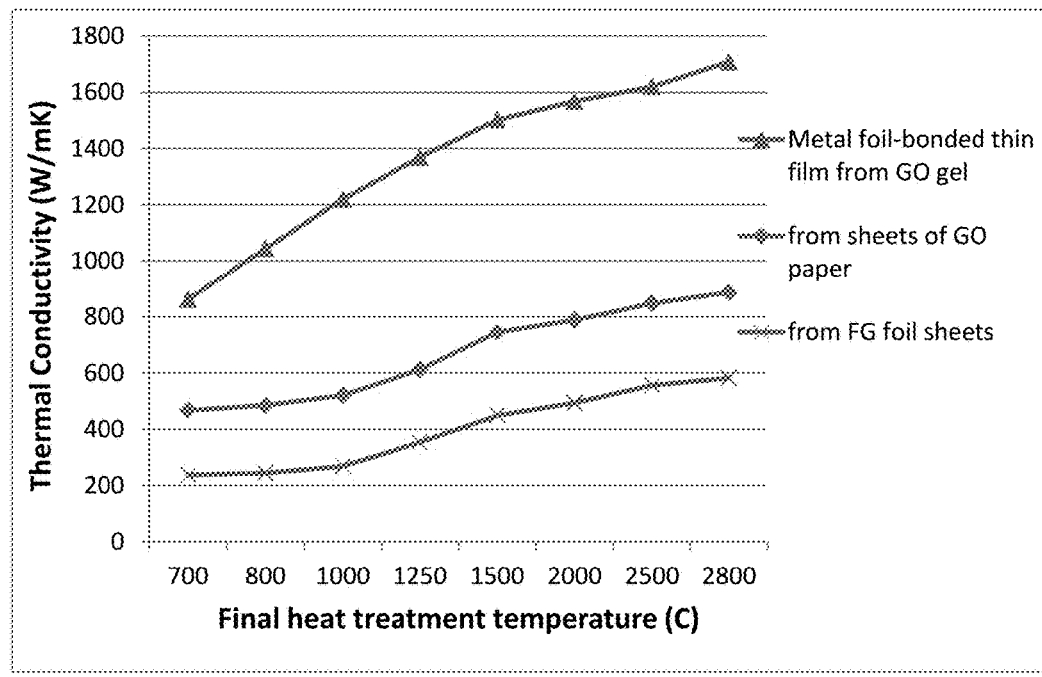
FIG. 4(A) Thermal conductivity values of the GO gel-derived graphene layer, GO platelet paper, and FG foil plotted as a function of the final heat treatment temperature for graphitization.

FIG. 4(A) shows the thermal conductivity values of the GO gel-derived GO film, GO platelet paper prepared by vacuum-assisted filtration of RGO, and FG foil, respectively, all plotted as a function of the final HTT. These data have clearly demonstrated the superiority of the GO thin film in terms of the achievable thermal conductivity at a given heat treatment temperature. All the prior art work on the preparation of paper or membrane from pristine graphene or graphene oxide sheets/platelets follows distinctly different processing paths, leading to a simple aggregate or stack of discrete graphene/GO/RGO platelets. These simple aggregates or stacks exhibit many folded graphite flakes, kinks, gaps, and mis-orientations, resulting in poor thermal conductivity, low electrical conductivity, and weak mechanical strength. As shown in FIG. 4(A), even at a heat treatment temperature as high as 2,800° C., the GO platelet paper exhibits a thermal conductivity less than 1,000 W/mK, much lower than the >1,700 W/mK of the GO gel-derived unitary graphene entity.

Figure 4B:
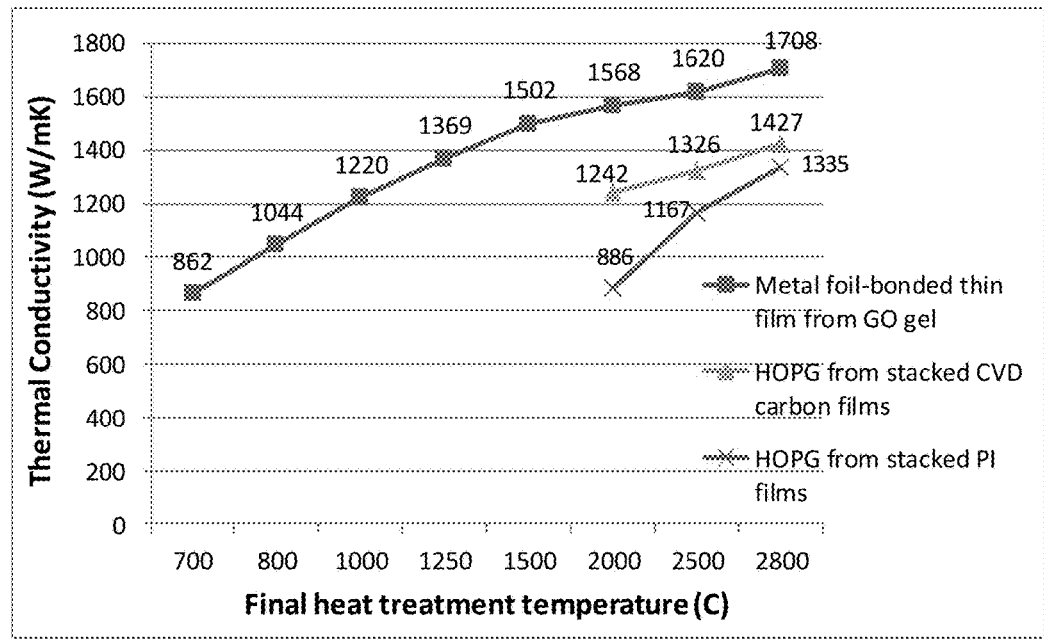
FIG. 4(B) Thermal conductivity values of the GO gel-derived graphene layer, polyimide-derived pyrolytic graphite (PG), and CVD carbon-derived PG, all plotted as a function of the final graphitization or re-graphitization temperature.

For comparison, we have also carbonized polyimide films at 500° C. for 1 hour and at 1,000° C. for 3 hours in an inert atmosphere and then graphitized the films at a temperature in the range of 2,500-3,000° C. for 1 to 5 hours to form a conventional pyrolytic graphite (PG) film. FIG. 4(B) shows the thermal conductivity values of the GO-derived thin film and the CVD carbon film-derived PG heat-treated for 3 hours, all plotted as a function of the final graphitization or re-graphitization temperature. These data show that the conventional PG, produced by carbonizing polyimide (PI) and then graphitizing the carbonized PI, exhibits a consistently lower thermal conductivity as compared to the GO gel-derived GO thin film alone, given the same HTT for the same length of heat treatment time. For instance, the PG from PI exhibits a thermal conductivity of 820 W/mK after a graphitization treatment at 2,000° C. for one hour and 1,242 W/mK at 2,000° C. for 3 hours. These observations have demonstrated a clear and significant advantage of using the GO gel approach to producing thin film of GO bonded on metal foil versus the conventional PG approach to producing oriented graphite crystals. As a matter of fact, no matter how long the graphitization time is for the PG, the thermal conductivity is always lower than that of a GO gel-derived GO film. In other words, the thin film of GO-bonded on metal foil is fundamentally different and patently distinct from the flexible graphite (FG) foil, graphene/GO/RGO paper/membrane, and pyrolytic graphite (PG) in terms of chemical composition, crystal and defect structure, crystal orientation, morphology, process of production, and properties.

Figure 4C:
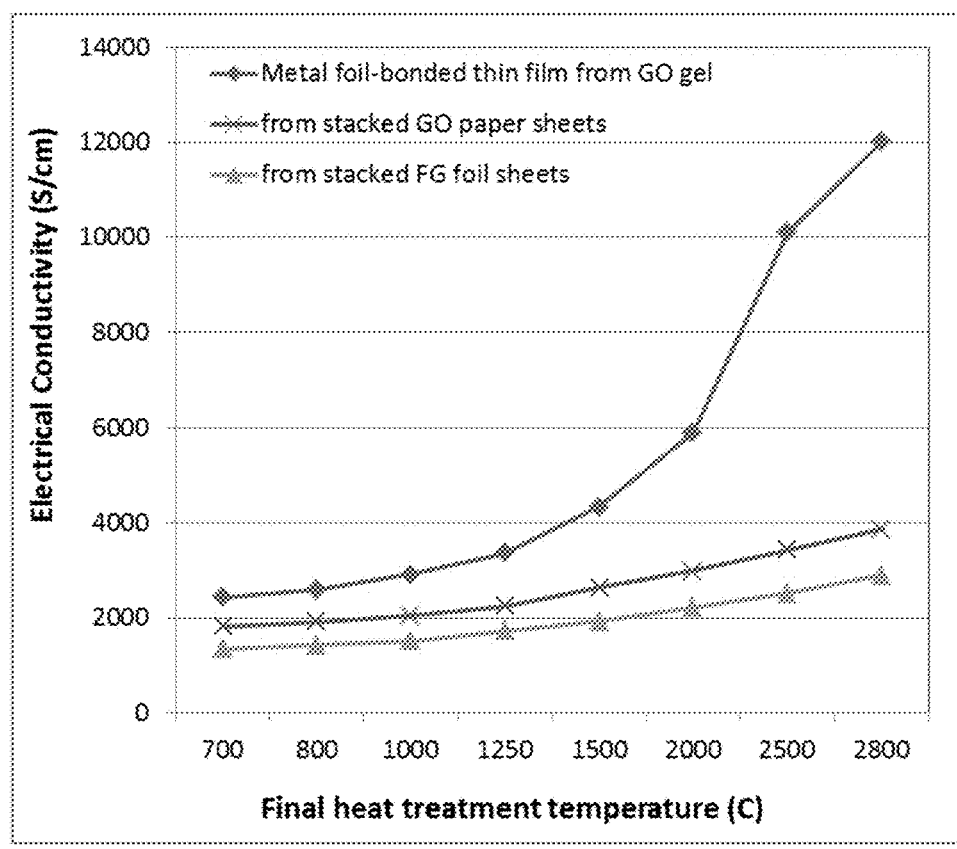
FIG. 4(C) Electric conductivity values of the GO gel-derived graphene layer, GO platelet paper, and FG foil, plotted as a function of the final graphitization or re-graphitization temperature.

The above conclusion is further supported by the data in FIG. 4(C) showing the electric conductivity values of the GO-derived GO film are far superior to those of the GO paper from RGO platelets and FG foil over the entire range of final HTTs investigated.

Example 5: Electrical and Thermal Conductivity Measurements of Various Graphene Oxide Gel-Derived Thin Films Four-point probe tests were conducted on thin film of GO layer alone (coated on a metal foil surface and then peeled off and heat treated), GO/RGO paper, and the FG foils alone to measure their in-plane electrical conductivity. Their in-plane thermal conductivity was measured using a laser flash method (Netzsch Thermal Diffusivity Device).

The in-plane thermal and electrical conductivities and tensile properties of various films were investigated. With a thickness of approximately 75 μm, the thermal conductivity of the flexible graphite foil alone is less than 237 W/mK if the FG foil is not heat-treated at or above 700° C. As the post-recompression heat treatment temperature increases from 700° C. to 2,800° C. (for one hour of graphitization treatment in each case), the thermal conductivity of the FG foil increases from 237 to 582 W/mK, indicating some but limited re-organization of the graphitic structure induced by the heat treatment. By contrast, the thermal conductivity of the GO gel-derived thin graphene layer alone increases from 983 to 1,807 W/mK. This thin film is obtained by shearing and depositing a layer of GO gel on a Cu foil surface, removing the liquid from the GO layer in vacuum for 1 hour, and heat-treating the dried solid GO layer. This indicates a significant or dramatic re-organization of the graphitic structure induced by the heat treatment, with all GO molecules linked or merged edge-to-edge and face-to-face into an integrated graphene body of fully and orderly bonded graphene planes.

Also obtained were the thermal conductivity data of corresponding flexible graphite foil (FG prepared by roll-pressing of exfoliated graphite worms) and foil or mat of expanded graphite flakes (prepared by breaking up graphite worms into graphite flakes as described in Example 1, which were then packed and roll-pressed into a thin foil/mat). The highest thermal conductivity value achievable with the expanded graphite foil is <800 W/mK and that with FG is <600 W/mK, both being dramatically lower than those of both the unitary graphene matrix and the graphene matrix composite.

Figure 7A:
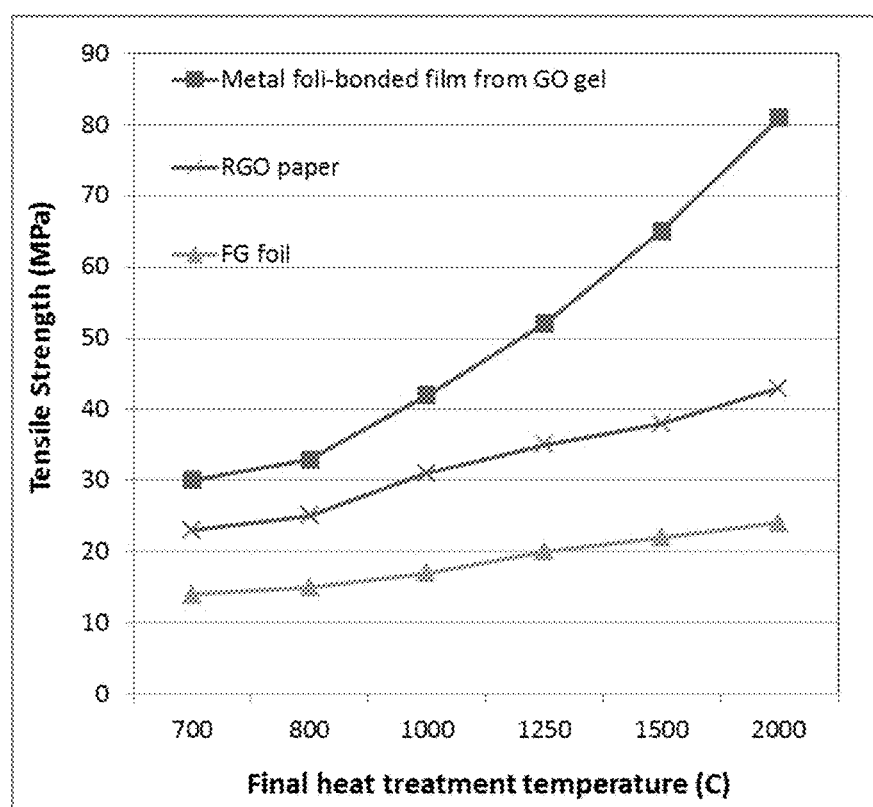
FIG. 7(A) Tensile strength of thin film of GO derived from GO gel, paper of discrete GO platelets (not from GO gel state), and flexible graphite foil over a range of heat treatment temperatures.

Example 6: Tensile Strength of Various Graphene Oxide-Derived Unitary Graphene Matrix Composites A series of GO gel-derived thin-film graphene layers, GO platelet paper, and FG foil were prepared. A universal testing machine was used to determine the tensile strength of these materials. The tensile strength values of the thin film of graphene oxide, GO platelet paper, and FG paper are plotted as a function of the re-graphitization temperature, FIG. 7(a). These data have demonstrated that the tensile strength of the flexible graphite foil remains relatively constant (all <20 MPa) and that of the GO paper increases slightly (from 22 to 43 MPa) when the heat treatment temperature increases from 700 to 2,800° C. In contrast, the tensile strength of the GO-derived unitary graphene layer increases dramatically from 32 to >100 MPa over the same range of heat treatment temperatures. This result is quite striking and further reflects the notion that the GO gel-derived GO layer contains highly live and active molecules during the heat treatment, while the graphene platelets in the conventional GO paper and the graphite flakes in the FG foil are essentially dead molecules. The GO-derived unitary graphene entity is a class of material by itself.

The scratch test was conducted using the so-called Ford Lab Test Method (FLTM) BN108-13. This apparatus consists of a movable platform connected to five beams with 250 mm in length. A scratch pin is attached to one end of each beam. A highly polished hardened steel ball (1.0±0.1 mm diameter) is placed on the tip of each pin. Each pin is loaded with a weight that exerts a force of 7N, 6N, 3N, 2N, and 0.6N, respectively. Driven by compressed air, the beams draw the pins across the specimen surface and generate scratches. The scratch is made at a sliding velocity of approximately 100 mm/s. All tests were performed at room temperature. Although the test method requires that grained surfaces be evaluated, only the smooth surfaces of the specimens were tested in this study.

Figure 7B:
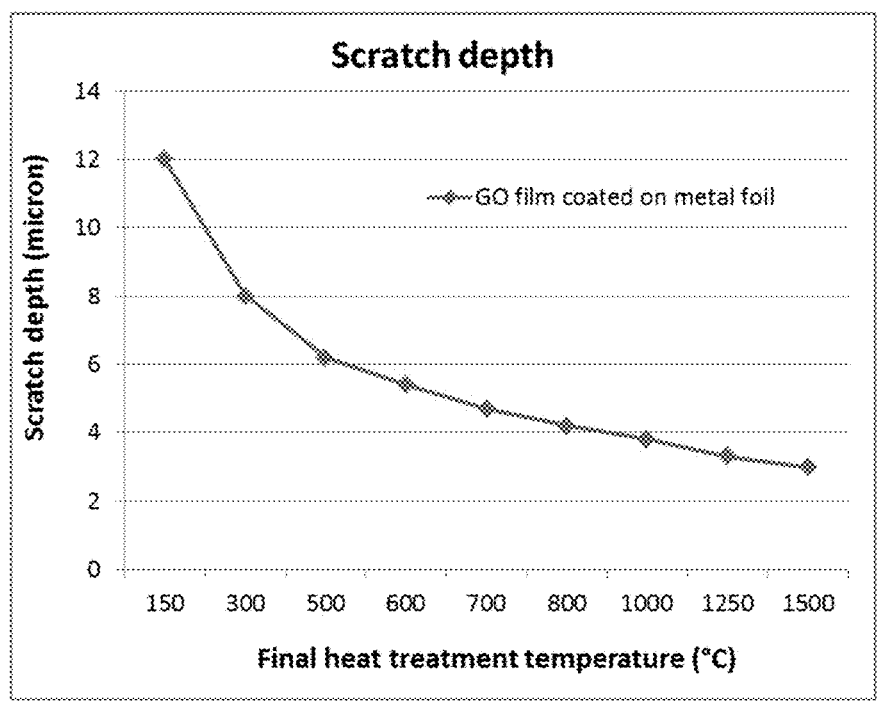
FIG. 7(B) Scratch resistance GO thin films plotted as a function of the heat treatment temperature.

After the specimen plaques were scratched, they were evaluated with a reflected light polarizing microscope incorporating a Xenon light source. An image analyzer with Image Analysis Software was used to measure the "gray scale mass," which is the total gray scale value of the object. The camera objective lens is positioned at an angle of 90° from the scratch. The objective lens then registers a portion of the scratch about 1 mm long. The electron signal for each scratch line is then integrated and recorded. The optical mass of an object, M, is the sum of the gray level values, GL, of all pixels in the object. The individual gray level values are assigned by the image analysis program in unit steps in the range of 0-255, where 0=black and 255=white. The optical mass, M, can be computed from: $M=\Sigma GL_i$ (sum over i to n), where n is the number of pixels. The brightness of the object, B, is B=M/A, where A represents the area of the object. The percentage change in the brightness between the scratch and the background is the scratch visibility, $\Delta B$, given by $\Delta B = [(B_{scratch} - B_{background})/(B_{background})] \times 100\%$. The depth of the scratch was measured using an interferometer. The magnification was set at 5×. Depth measurements were made from the depth histogram of the scanned area. The scratch test results are shown in FIG. 7(B). The scratches were also examined using a scanning electron microscope (SEM).

Example 7: Li—S Cell Containing a Graphene Oxide-Bonded Metal Foil Current Collector at the Anode and at the Cathode Three (3) Li—S cells were prepared and tested, each one having a lithium foil as the anode active material, a sulfur/expanded graphite composite (75/25 wt. ratio) as the cathode active material, 1M of $LiN(CF_3SO_2)_2$ in DOL as the electrolyte, and a Celgard 2400 as the separator. The first cell (a baseline cell for comparison) contains a 10-μm thick Cu foil as the anode current collector and a 20-μm thick Al foil as the cathode current collector. The second cell (another baseline cell for comparison) has a 10-μm thick GO-resin layer as the anode current collector and a sheet of 14-μm RGO-coated Al foil as the cathode current collector. The third cell has a GO-bonded Cu foil (totally 12-μm thick) of the present invention as the anode current collector and a sheet of a 20-μm thick GO-coated Al foil as the cathode current collector.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, and the binder, but excluding the current collectors). The specific energy and specific power values presented in this section are based on the total cell weight (including anode and cathode, separator and electrolyte, current collectors, and packaging materials). The morphological or micro-structural changes of selected samples after a desired number of repeated charging and recharging cycles were observed using both transmission electron microscopy (TEM) and scanning electron microscopy (SEM).

Figure 9A:
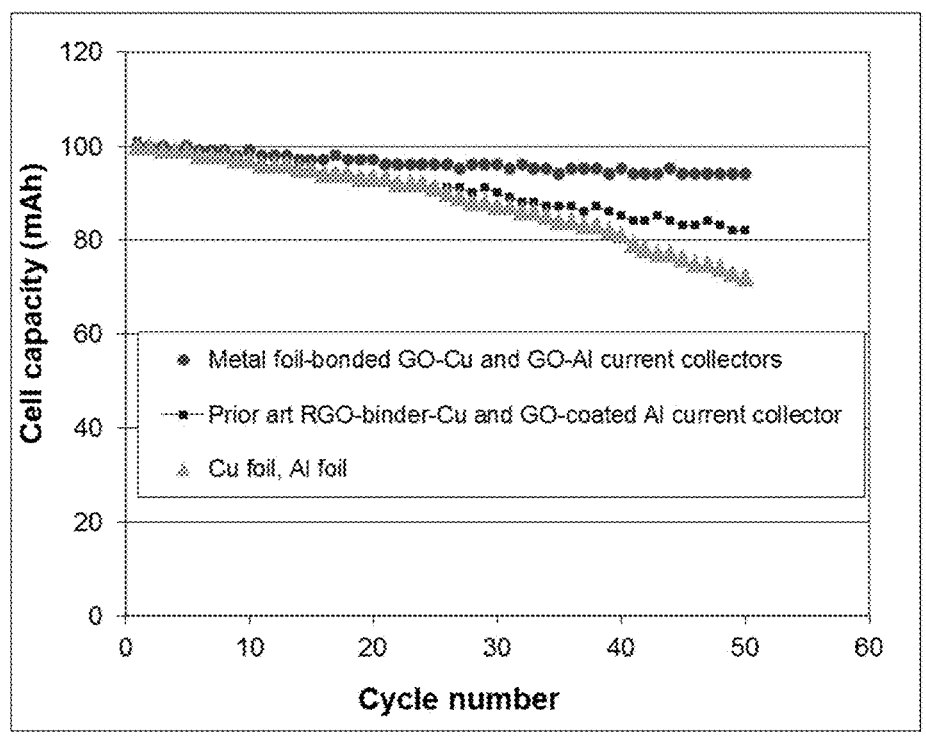
FIG. 9(A) the discharge capacity values of three Li—S cells each as a function of the charge/discharge cycle number; first cell having GO-bonded Cu foil and GO-bonded Al foil as the anode and cathode current collectors, respectively; second cell having GO/resin-coated Cu foil and GO-coated Al foil (no pre-etching) as the anode and cathode current collector, respectively (a prior art cell); third cell having a Cu foil anode current collector and Al foil cathode current collector (a prior art cell).

FIG. 9(A) shows the discharge capacity values of the three cells each as a function of the charge/discharge cycle number. Each cell was designed to have an initial cell capacity of 100 mAh to facilitate comparison. It is clear that the Li—S cell featuring the presently invented GO-bonded current collector at both the anode and the cathode exhibits the most stable cycling behavior, experiencing a capacity loss of 6% after 50 cycles. The cell containing GO/resin-coated Cu and GO-coated Al current collector suffers from a 23% capacity decay after 50 cycles. The cell containing a Cu foil anode current collector and an Al foil cathode current collector suffers from a 26% capacity decay after 50 cycles. Post-cycling inspection of the cells indicate that Al foil in all prior art electrodes suffered a severe corrosion problem. In contrast, the presently invented graphene oxide-bonded Al current collectors remain intact.

Figure 9B:
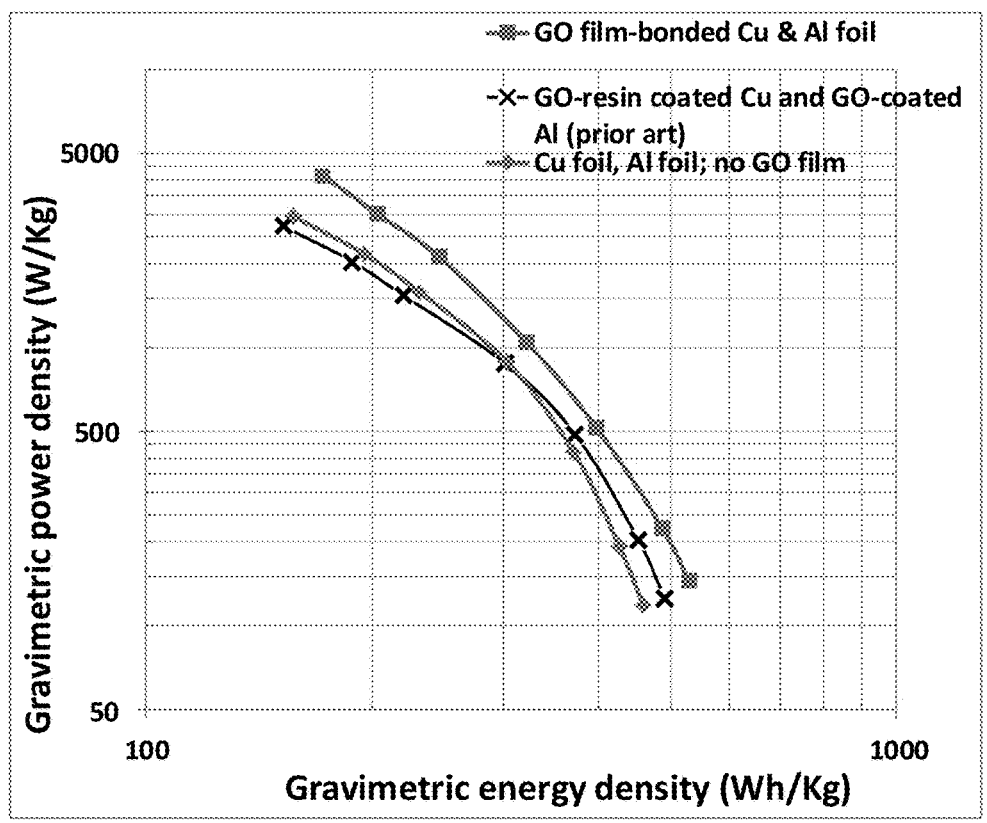
FIG. 9(B) Ragone plots of the three cells: first cell having GO-bonded Cu foil and GO-bonded Al foil as the anode and cathode current collectors, respectively; second cell having GO/resin-coated Cu foil and GO-coated Al foil (no pre-etching) as the anode and cathode current collector, respectively (a prior art cell); third cell having a Cu foil anode current collector and Al foil cathode current collector (a prior art cell).

FIG. 9(B) shows the Ragone plots (gravimetric power density vs. gravimetric energy density) of the three cells. It is of interest to note that our GO-bonded metal foil current collectors surprisingly impart both higher energy density and higher power density to the Li—S cell compared to prior art graphene/resin-coated current collector at the anode (with GO-coated Al foil at the cathode), and Cu/Al current collectors. This is quite unexpected considering that Cu foil has an electrical conductivity that is more than one order of magnitude higher than that of the graphene film. The difference in the energy density and power density values are more than what can be accounted for by the physical density difference between Cu foil and graphene film at the anode.

Example 8: Magnesium-Ion Cell Containing a Graphene-Enabled Current Collector at the Anode and at the Cathode For the preparation of a cathode active material (Magnesium Manganese Silicate, $Mg_{1.03}Mn_{0.97}SiO_4$), reagent-grade KCl (melting point=780° C.) was used as flux after drying for 3 h at 150° C. under vacuum. The starting materials were magnesium oxide (MgO), manganese (II) carbonate ($MnCO_3$) and silicon dioxide ($SiO_2$, 15-20 nm) powder. The stoichiometric amounts for the precursor compounds were controlled with the molar ratio of 1.03:0.97:1 for Mg:Mn:Si. The mixture (flux/reactants molar ratio=4) was hand-ground in a mortar by pestle for a 10 minutes, and then poured into a corundum crucible. Then, the powder mixture was dried at 120° C. for 5 h in a vacuum to minimize the water content in the mixture. Subsequently, the mixture was immediately transferred to a tube furnace and heated in a reductive atmosphere (Ar+5 wt % H2) at 350° C. for 2 h to remove carbonate groups. This was followed by final firing at various temperatures at a rate of 2° C./min for 6 h, then cooling to room temperature naturally. Finally, the product (Magnesium Manganese Silicate, $Mg_{1.03}Mn_{0.97}SiO_4$) was washed three times with deionized water to dissolve any remaining salt, separated by centrifugation, and dried under vacuum at 100° C. for 2 h.

The electrodes (either the anode or cathode) were typically prepared by mixing 85 wt % of an electrode active material (e.g. $Mg_{1.03}Mn_{0.97}SiO_4$ particles, 7 wt % acetylene black (Super-P), and 8 wt % polyvinylidene fluoride binder (PVDF, 5 wt % solid content dissolved in N-methyl-2-pyrrolidinoe (NMP)) to form a slurry-like mixture. After coating the slurry on an intended current collector, the resulting electrode was dried at 120° C. in vacuum for 2 h to remove the solvent before pressing. Three cells having different current collectors were investigated: first cell having GO-bonded Cu foil and GO-bonded Al foil as the anode and cathode current collectors, respectively; second cell having GO/resin-coated Cu foil and GO-coated Al foil (no pre-etching) as the anode and cathode current collector, respectively (a prior art cell); third cell having a Cu foil anode current collector and Al foil cathode current collector (a prior art cell).

Subsequently, the electrodes were cut into disks (diameter=12 mm) for use as a cathode. A thin sheet of magnesium foil was attached to the anode current collector surface, and a piece of porous separator (e.g., Celgard 2400 membrane) was, in turn, stacked on top of the magnesium foil. A piece of cathode disc coated on a cathode current collector was used as a cathode and stacked over the separator layer to form a CR2032 coin-type cell. The electrolyte used was 1 M of $Mg(AlCl_2EtBu)_2$ in THF. The cell assembly was performed in an argon-filled glove-box. The CV measurements were carried out using a CHI-6 electrochemical workstation at a scanning rate of 1 mV/s. The electrochemical performance of the cells was also evaluated by galvanostatic charge/discharge cycling at a current density of from 50 mA/g to 10 A/g (up to 100 A/g for some cells), using an Arbin and/or a LAND electrochemical workstation.

Figure 10:
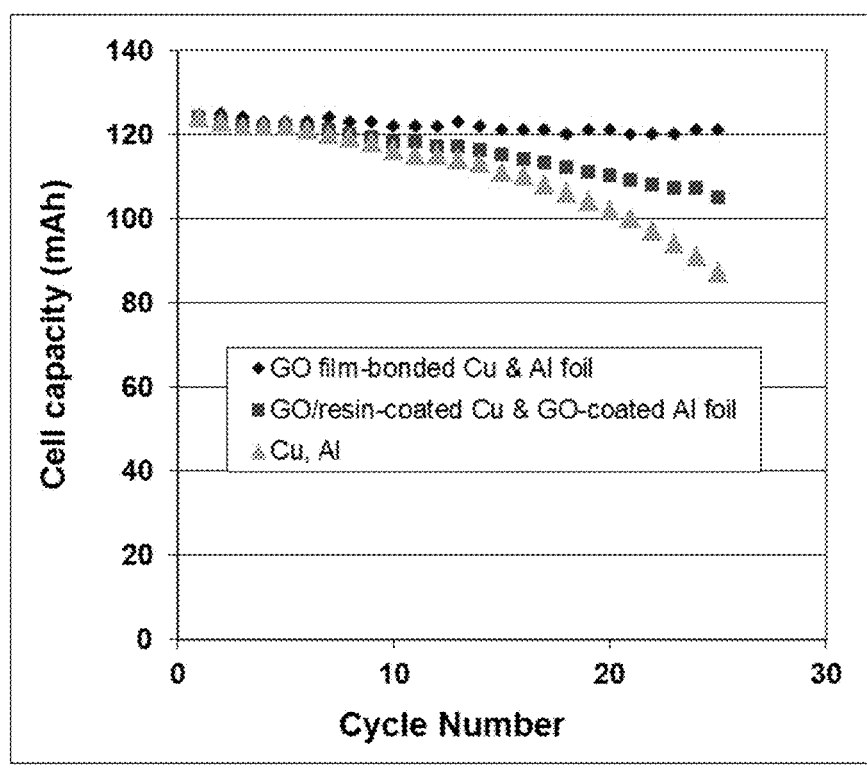
FIG. 10 The cell capacity values of three magnesium metal cells; first cell having GO-bonded Cu foil and GO-bonded Al foil as the anode and cathode current collectors, respectively; second cell having GO/resin-coated Cu foil and GO-coated Al foil (no pre-etching) as the anode and cathode current collector, respectively (a prior art cell); third cell having a Cu foil anode current collector and Al foil cathode current collector (a prior art cell).

FIG. 10 shows the cell discharge specific capacity values of the three cells each as a function of the charge/discharge cycle number. It is clear that the Mg-ion cell featuring the presently invented current collectors at both the anode and the cathode exhibits the most stable cycling behavior, experiencing a capacity loss of 2.5% after 25 cycles. The cell containing GO/resin-coated Cu foil and GO-coated Al foil current collectors suffers from a 17% capacity decay after 25 cycles. The cell containing a Cu foil anode current collector and an Al foil cathode current collector suffers from a 30% capacity decay after 25 cycles. Post-cycling inspection of the cells indicate that GO/resin-coated Cu foil and GO-coated Al foil current collectors got swollen and showed some delamination from the cathode layer and that Al foil suffered a severe corrosion problem. In contrast, inventive GO-bonded metal foil current collectors remain intact.

Example 9: Chemical and Mechanical Compatibility Testing of Various Current Collectors for Various Intended Batteries or Supercapacitors As demonstrated in Examples 8 and 9 above, long-term stability of a current collector relative to the electrolyte of a battery or supercapacitor is a major concern. In order to understand the chemical stability of various current collectors, a major task was undertaken to expose current collectors in several representative electrolytes. After an extended period of time (e.g. 30 days), the current collector was removed from the electrolyte solution and observed using optical and scanning electron microscopy (SEM). The results are summarized in Table 3 below, which consistently demonstrate that the inventive GO-bonded metal foil current collectors are highly compatible with all kinds of liquid electrolytes commonly used in batteries and supercapacitors. The inventive materials are resistant to any chemical attack. These GO-protected current collectors are essentially electrochemically inert over a voltage range of 0-5.5 volts Vs. $Li/Li^+$, suitable for use with just about any battery/capacitor electrolyte.

It may be noted that each current collector must be connected to a tab that is, in turn, connected to an external circuit wire. The current collector must be mechanically compatible with the tab, being readily or easily fastened or bonded thereto. We have found that CVD graphene films just cannot be mechanically fastened to the tab without being easily broken or fractured. Even with the assistance of adhesive, the CVD film is easily fractured during the procedures of connecting to a tab or battery cell packaging.

TABLE 3

Results of current collector-electrolyte compatibility testing.

| Sample No. | Intended battery or supercapacitor | Current collector | Electrolyte | Observations |
|---|---|---|---|---|
| Li-1A | Li-ion or Li metal | GO film-bonded Cu foil | 1M $LiPF_6$ in PC + DME | Remains intact, no swelling, no micro-cracking; no pits. |
| Li-1B | Li-ion or Li metal | CVD graphene film | 1M $LiPF_6$ in PC + DME | Micro-cracks formed along grain boundaries |
| Li-1C | Li-ion or Li metal | RGO coated on PET film | 1M $LiPF_6$ in PC + DME | RGO layer swollen, delamination from PET film |
| Na-1A | Na-ion or Na metal | GO film-bonded Ti foil | 1M $NaClO_4$ in DOL + DEC | Remains intact, no swelling, no micro-cracking |
| Na-1B | Na-ion or Na metal | CVD graphene film | 1M $NaClO_4$ in DOL + DEC | Micro-cracks formed along grain boundaries |
| Sup-1A | Supercapacitor or hybrid | GO film-bonded Al foil | 1M $H_2SO_4$ in water | Remains intact, no swelling, no micro-cracking |
| Sup-1B | Supercapacitor or hybrid | Flexible graphite foil | 1M $H_2SO_4$ in water | Severely swollen, flaking (graphite flakes coming off) |
| Sup-1C | Supercapacitor or hybrid | GO film-bonded Al foil | Alkylammonium in acetonitrile | Remains intact, no swelling, no micro-cracking, no pitting corrosion |
| Sup-1D | Supercapacitor or hybrid | Carbon-coated Al | Alkylammonium in acetonitrile | Corrosion of Al layer; some carbon flaking |

TABLE 3-continued

Results of current collector-electrolyte compatibility testing.

| Sample No. | Intended battery or supercapacitor | Current collector | Electrolyte | Observations |
|---|---|---|---|---|
| Zn-1A | Zinc-air | GO film-bonded Ni foil | KOH in water | Remains intact, no swelling, no micro-cracking |
| Zn-1B | Zinc-air | Flexible graphite foil | KOH in water | Severely swollen, flaking |

In conclusion, we have successfully developed an absolutely new, novel, unexpected, and patently distinct class of highly conducting material: graphene oxide gel-derived thin film of GO bonded on metal foils. The chemical composition, structure (crystal perfection, grain size, defect population, etc), crystal orientation, morphology, process of production, and properties of this new class of materials are fundamentally different and patently distinct from flexible graphite foil, polymer-derived pyrolytic graphite, CVD-derived PG (including HOPG), and catalytic CVD graphene thin film that are free-standing or coated on a metal foil. The thermal conductivity, electrical conductivity, scratch resistance, surface hardness, and tensile strength exhibited by the presently invented materials are much higher than what prior art flexible graphite sheets, paper of discrete graphene/GO/RGO platelets, or other graphitic films could possibly achieve. These GO gel-derived thin film structures have the best combination of excellent electrical conductivity, thermal conductivity, mechanical strength, surface scratch resistance, hardness, and no tendency to flake off.

The invention claimed is:

1. A graphene oxide-bonded metal foil current collector in a battery or supercapacitor, said current collector comprising:
   (a) a free-standing, non-supported thin metal foil having a thickness from 1 μm to 30 μm and two opposed but parallel primary surfaces wherein said metal foil is selected from Cu, Ti, Ni, stainless steel, or Al foil; and
   (b) a thin film of graphene oxide sheets chemically bonded to at least one of said two opposed primary surfaces of said metal foil without using a binder or adhesive wherein said at least one primary surface does not contain a layer of passivating metal oxide and wherein said thin film of graphene oxide has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets being oriented substantially parallel to each other and parallel to said primary surfaces, exhibiting a thermal conductivity greater than 500 W/mK, and/or electrical conductivity greater than 1,500 S/cm when measured alone without said thin metal foil, wherein said graphene oxide sheets are chemically bonded in an edge to edge manner and wherein said graphene oxide sheets are in direct contact with and bonded to at least one of said two opposed primary surfaces of said metal foil.

2. The current collector of claim 1, wherein each of said two opposed primary surfaces is chemically bonded with a thin film of graphene oxide sheets without using a binder or adhesive; wherein said thin film of graphene oxide has a thickness from 10 nm to 10 μm, an oxygen content from 0.1% to 10% by weight, an inter-graphene plane spacing of 0.335 to 0.50 nm, a physical density from 1.3 to 2.2 g/cm$^3$, all graphene oxide sheets are oriented substantially parallel to each other and parallel to said primary surfaces, exhibiting a thermal conductivity greater than 500 W/mK and electrical conductivity greater than 1,500 S/cm when measured alone without said thin metal foil.

3. The current collector of claim 1, wherein said thin metal foil has a thickness from 4 to 10 μm.

4. The current collector of claim 1, wherein said thin film of graphene oxide sheets has a thickness from 20 nm to 2 μm.

5. The current collector of claim 1, wherein a surface of said Al foil has no passivating Al$_2$O$_3$ formed thereon prior to being bonded to said graphene oxide sheets.

6. The current collector of claim 1, wherein the thin film of graphene oxide sheets has an oxygen content from 1% to 5% by weight.

7. The current collector of claim 1, wherein said thin film of graphene oxide has an oxygen content less than 1%, an inter-graphene spacing less than 0.345 nm, and an electrical conductivity no less than 3,000 S/cm.

8. The current collector of claim 1, wherein said thin film of graphene oxide has an oxygen content less than 0.1%, an inter-graphene spacing less than 0.337 nm, and an electrical conductivity no less than 5,000 S/cm.

9. The current collector of claim 1, wherein said thin film of graphene oxide has an oxygen content no greater than 0.05%, an inter-graphene spacing less than 0.336 nm, a mosaic spread value no greater than 0.7, and an electrical conductivity no less than 8,000 S/cm.

10. The current collector of claim 1, wherein said thin film of graphene oxide has an inter-graphene spacing less than 0.336 nm, a mosaic spread value no greater than 0.4, and an electrical conductivity greater than 10,000 S/cm.

11. The current collector of claim 1, wherein said thin film of graphene oxide exhibits an inter-graphene spacing less than 0.337 nm and a mosaic spread value less than 1.0.

12. The current collector of claim 1, wherein said thin film of graphene oxide exhibits a degree of graphitization no less than 80% and/or a mosaic spread value no greater than 0.4.

13. The current collector of claim 1, wherein the thin film of graphene oxide sheets is obtained by depositing a graphene oxide gel onto said at least primary surface under the influence of an orientation-controlling stress and then heat-treating said graphene oxide gel at a heat treatment temperature from 80° C. to 1,500° C.

14. The current collector of claim 13, wherein said heat treatment temperature is from 80° C. to 500° C.

15. The current collector of claim 13, wherein said heat treatment temperature is from 80° C. to 200° C.

16. The current collector of claim 1, wherein said thin film of graphene oxide contains chemically bonded graphene molecules or chemically merged graphene planes that are parallel to one another.

17. The current collector of claim 13, wherein said graphene oxide gel is obtained from a graphitic material having a maximum original graphite grain size and said thin film of graphene oxide has a grain size larger than said maximum original grain size.

18. The current collector of claim 13, wherein said graphene oxide gel is produced from particles of a natural graphite or artificial graphite composed of graphite crystallites having an initial length $L_a$ in the crystallographic a-axis direction, an initial width $L_b$ in the b-axis direction, and a thickness $L_c$ in the c-axis direction, and the thin film of graphene oxide has a graphene domain or crystal length or width greater than the initial $L_a$ and $L_b$ of the graphite crystallites.

19. The current collector of claim 1, wherein said thin film of graphene oxide contains graphene planes having a combination of $sp^2$ and $sp^3$ electronic configurations.

20. The current collector of claim 1, wherein said thin film of graphene oxide is a continuous length film having a length no less than 5 cm and a width no less than 1 cm.

21. The current collector of claim 1, wherein said thin film of graphene oxide, when measured alone, has a physical density greater than 1.8 g/cm3, and/or a tensile strength greater than 40 MPa.

22. The current collector of claim 1, wherein said thin film of graphene oxide, when measured alone, has a physical density greater than 1.9 g/cm3, and/or a tensile strength greater than 60 MPa.

23. The current collector of claim 1, wherein said thin film of graphene oxide, when measured alone, has a physical density greater than 2.0 g/cm$^3$, and/or a tensile strength greater than 80 MPa.

24. A rechargeable lithium battery or lithium-ion battery containing the current collector of claim 1 as an anode current collector and/or a cathode current collector.

25. A rechargeable lithium battery containing the current collector of claim 1 as an anode current collector or a cathode current collector, which lithium battery is a lithium-sulfur cell, a lithium-selenium cell, a lithium sulfur/selenium cell, a lithium-air cell, a lithium-graphene cell, or a lithium-carbon cell.

26. A capacitor containing the current collector of claim 1 as an anode current collector or a cathode current collector, which capacitor is a symmetric ultracapacitor, an asymmetric ultracapacitor cell, a hybrid supercapacitor-battery cell, or a lithium-ion capacitor cell.

* * * * *